(12) United States Patent
Sakai et al.

(10) Patent No.: US 11,202,110 B2
(45) Date of Patent: Dec. 14, 2021

(54) INFORMATION PROCESSING APPARATUS, CONTROL METHOD OF THE SAME, AND STORAGE MEDIUM

(71) Applicant: CANON KABUSHIKI KAISHA, Tokyo (JP)

(72) Inventors: Tomoya Sakai, Kawasaki (JP); Kensuke Yasuma, Tokyo (JP); Kazuya Taniguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/253,811

(22) Filed: Jan. 22, 2019

(65) Prior Publication Data

US 2019/0158899 A1 May 23, 2019

Related U.S. Application Data

(63) Continuation of application No. PCT/JP2017/022434, filed on Jun. 19, 2017.

(30) Foreign Application Priority Data

Jul. 25, 2016 (JP) .............................. JP2016-145694

(51) Int. Cl.
*H04N 21/2343* (2011.01)
*H04N 21/2662* (2011.01)
(Continued)

(52) U.S. Cl.
CPC . *H04N 21/234345* (2013.01); *H04N 21/2402* (2013.01); *H04N 21/2662* (2013.01);
(Continued)

(58) Field of Classification Search
CPC ....... H04N 21/234345; H04N 21/2402; H04N 21/26258; H04N 21/2662; H04N 21/437; H04N 21/4728; H04N 21/6587
(Continued)

(56) References Cited

U.S. PATENT DOCUMENTS 8,553,084 B2 * 10/2013 Vallone .............. G06K 9/00771
348/143
2016/0029091 A1 * 1/2016 Le Floch ....... H04N 21/234345
375/240.26

FOREIGN PATENT DOCUMENTS

| JP | 2011-024018 A | 2/2011 |
| JP | 2016-046778 A | 4/2016 |
| WO | 2015/004276 A2 | 1/2015 |

OTHER PUBLICATIONS

H. Ruellan, et al., "Accept-Push-Policy Header Field draft-ruellan-http-accept-push-policy-00", Httpbis, Internet-Draft, Intended status: Experimental Expires: Apr. 18, 2016, Canon CRF Oct. 16, 2015, (https://tools.ietf.org/html/draft-ruellan-http-accept-push-policy-00).

* cited by examiner

*Primary Examiner* — Gims S Philippe
*Assistant Examiner* — Franklin S Andramuno
(74) *Attorney, Agent, or Firm* — Canon U.S.A., Inc. IP Division

(57) ABSTRACT

An information processing apparatus receives, from a server apparatus, image data of one or a plurality of partial areas of a plurality of partial areas forming an image. The information processing apparatus comprises: a designating unit configured to designate a region of interest in the image; an establishing unit configured to establish a connection as a logical communication path to the server apparatus, and establish, as a plurality of streams based on the connection to the server apparatus; a control unit configured to control the plurality of streams such that the image data of the region of interest is obtained preferentially to the partial area; and a receiving unit configured to receive image data from the server apparatus by using the plurality of streams controlled by the control unit.

21 Claims, 20 Drawing Sheets

(51) Int. Cl.
*H04N 21/262* (2011.01)
*H04N 21/6587* (2011.01)
*H04N 21/4728* (2011.01)
*H04N 21/24* (2011.01)
*H04N 21/437* (2011.01)

(52) U.S. Cl.
CPC ..... *H04N 21/26258* (2013.01); *H04N 21/437* (2013.01); *H04N 21/4728* (2013.01); *H04N 21/6587* (2013.01)

(58) Field of Classification Search
USPC .......................................................... 725/116
See application file for complete search history.

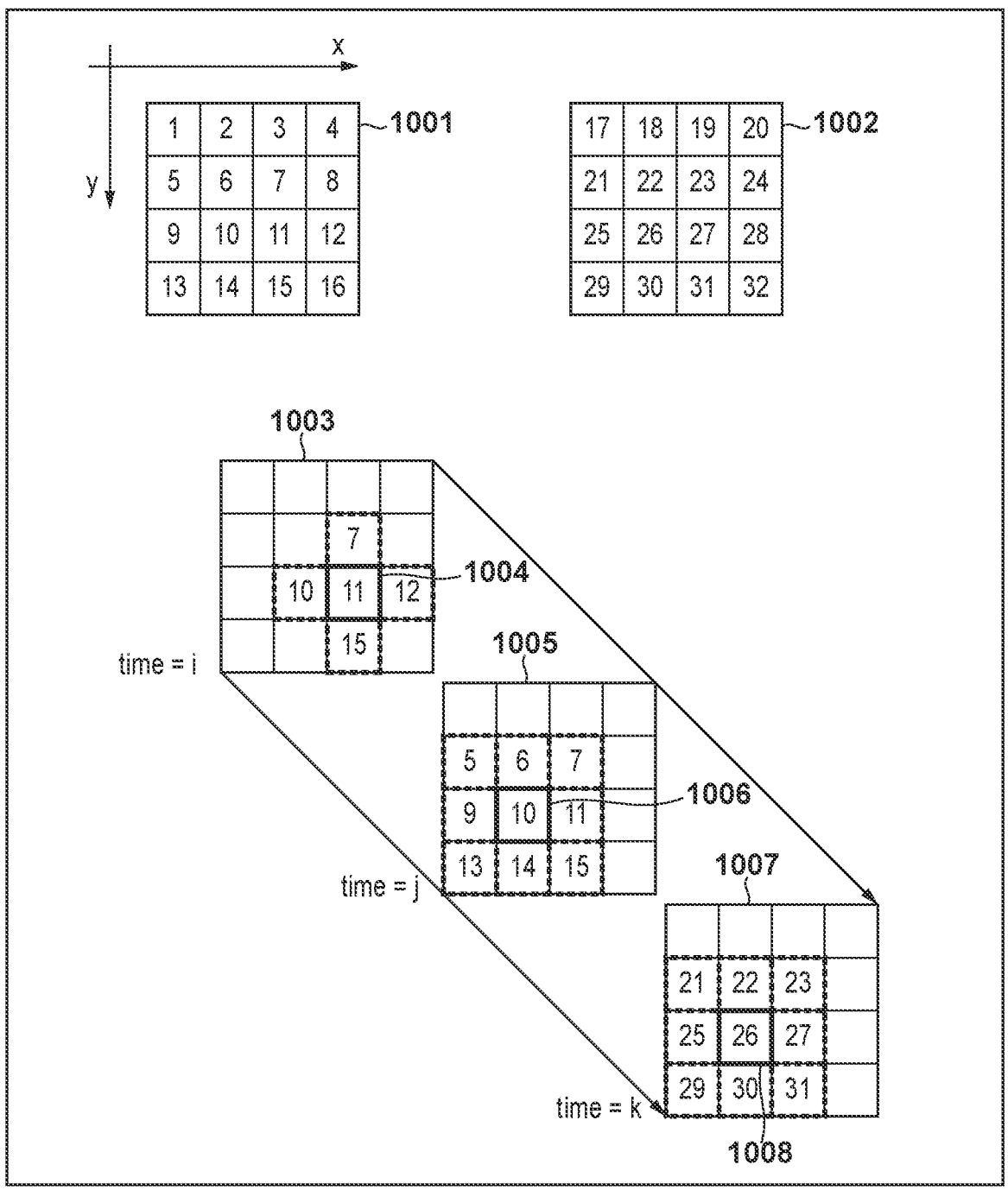

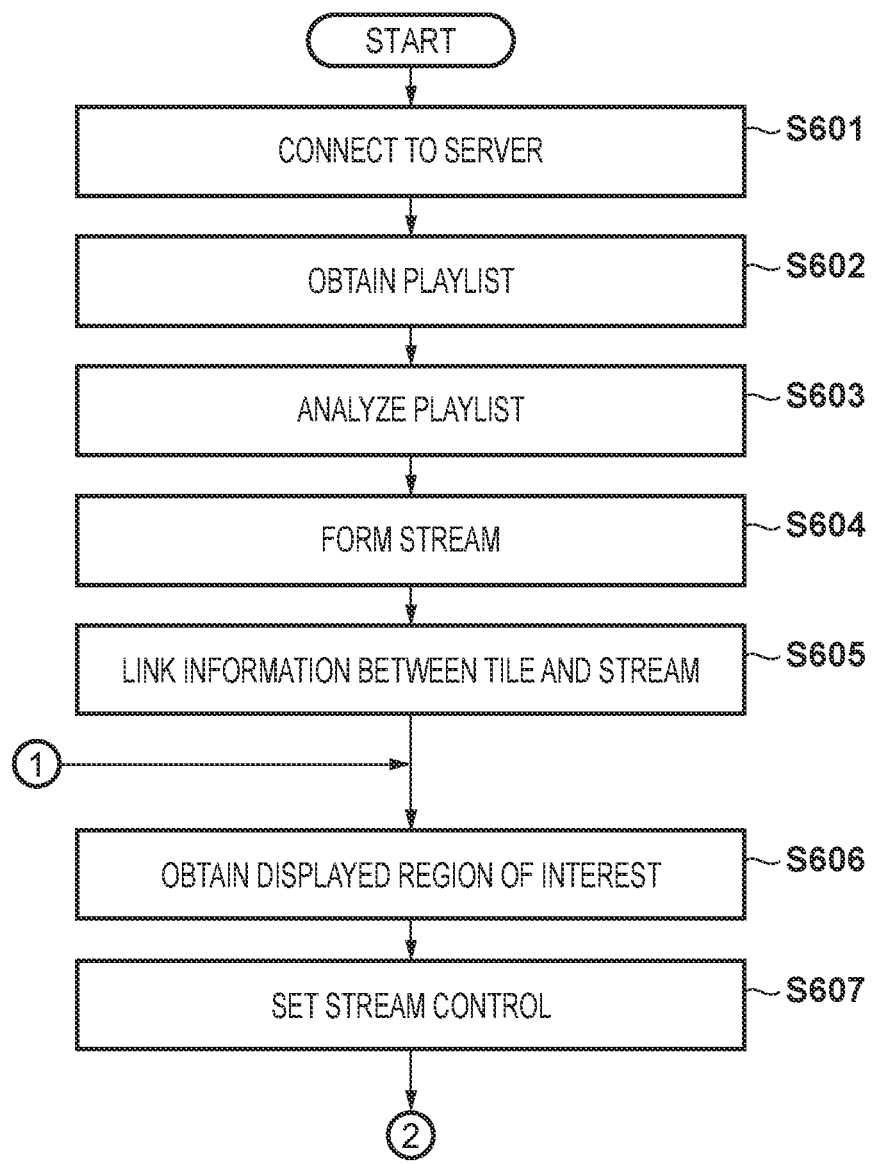

| a | b | c |
|---|---|---|
| d | e | f |
| g | h | i |

8B

| a(11, 12) | b(13, 14) | c(15, 16) |
|---|---|---|
| d(17, 18) | e(19, 20) | f(21, 22) |
| g(23, 24) | h(25, 26) | i(27, 28) |

8C

| j | k | l |
|---|---|---|
| m | n | o |
| p | q | r |

8D

| j(29, 30) | k(31, 32) | l(33, 34) |
|---|---|---|
| m(35, 36) | n(37, 38) | o(39, 40) |
| p(41, 42) | q(43, 44) | r(45, 46) |

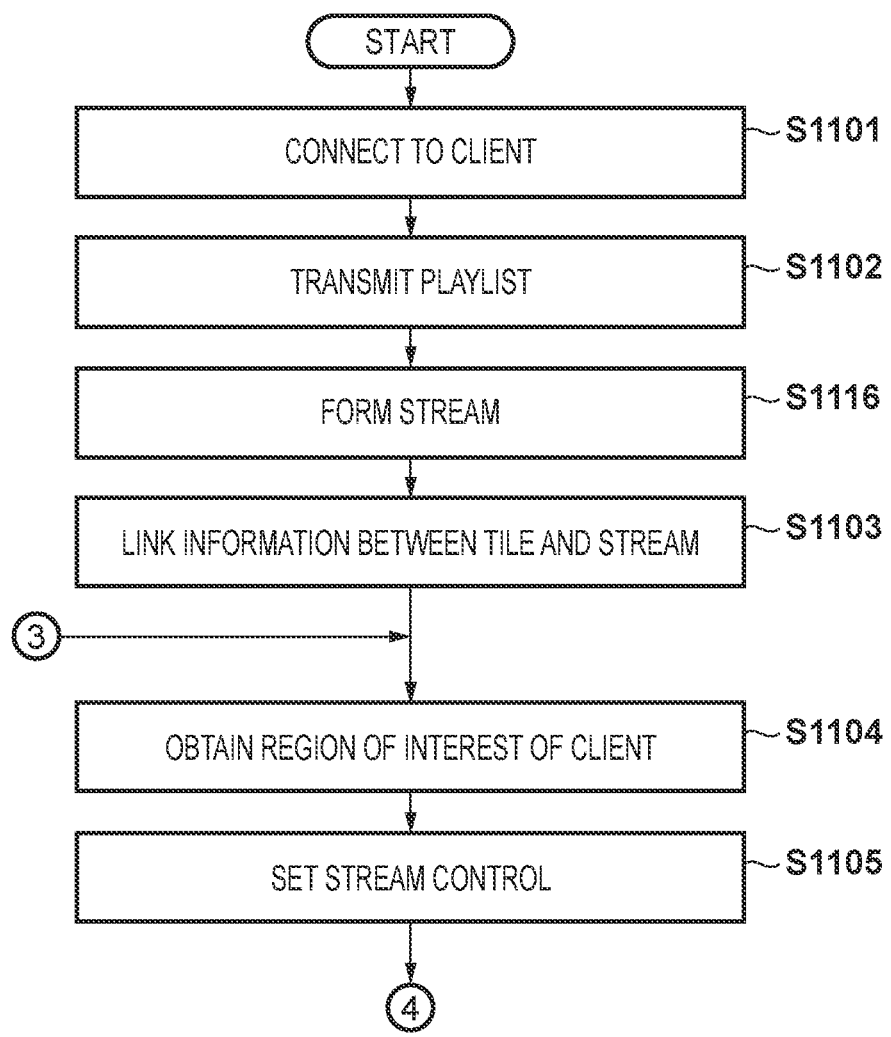

INFORMATION PROCESSING APPARATUS, CONTROL METHOD OF THE SAME, AND STORAGE MEDIUM

CROSS-REFERENCE TO RELATED APPLICATIONS

This application is a Continuation of International Patent Application No. PCT/JP2017/022434, filed Jun. 19, 2017, which claims the benefit of Japanese Patent Application No. 2016-145694, filed Jul. 25, 2016, both of which are hereby incorporated by reference herein in their entirety.

BACKGROUND OF THE INVENTION

Field of the Invention

The present invention relates to an information processing apparatus, a control method of the same, and a storage medium, and more particularly, to a data communication technique of performing image data communication.

Background Art

Recently, a distribution system which distributes streaming-type contents formed by audio data and video data to users in real time is provided. By using a distribution system like this, a user can enjoy a desired content such as live video on his or her own terminal apparatus in real time.

A technique by which video data in a region of interest (to be referred to as an "ROI" hereinafter) in video data is distributed at a high resolution is known. In this technique, video data is divided into tile-like regions beforehand, and data of the whole image and high-resolution data of a tile corresponding to a region containing an object of interest of the user are transmitted. Consequently, video data in which the image of the ROI has a high resolution can be distributed.

PTL 1 describes a technique which extracts data corresponding to a region as a user's viewing target from an image divided into a predetermined number of regions beforehand, and transmits the extracted data.

In the arrangement of PTL 1, a region of interest and its peripheral region are transmitted as one bit stream. In this arrangement, however, a peripheral region is contained in a bit stream, so the bandwidth of the network is consumed, and the transmission of the region of interest is sometimes delayed. As a consequence, the user cannot smoothly view the video data in some cases.

The present invention has been made in consideration of the above situation, and has as its object to provide a technique in which when communicating image data of a region of interest and image data of a region not of interest, a delay of the communication of the image data of the region of interest can be reduced.

CITATION LIST

Patent Literature

PTL 1: Japanese Patent Laid-Open No. 2011-24018

SUMMARY OF THE INVENTION

To achieve the above object, an information processing apparatus according to the present invention has the following arrangement. That is, an information processing apparatus for receiving, from a server apparatus, image data of one or a plurality of partial areas of a plurality of partial areas forming an image comprises: a designating unit configured to designate a region of interest in the image; an establishing unit configured to establish a connection as a logical communication path to the server apparatus, and establish, as a plurality of streams based on the connection to the server apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other; a control unit configured to control the plurality of streams such that the image data of the region of interest is obtained preferentially to the partial area; and a receiving unit configured to receive image data from the server apparatus by using the plurality of streams controlled by the control unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing the configuration of a communication system;

FIG. 2 is a view showing an example of the layer and tile configurations of video data;

FIG. 7A is a flowchart showing the operation of the client;

FIG. 8 is a view showing the correspondence relation between tiles of video data and stream identifiers;

FIG. 12A is a flowchart showing the operation of the server;

DESCRIPTION OF EMBODIMENTS

Figure 3:
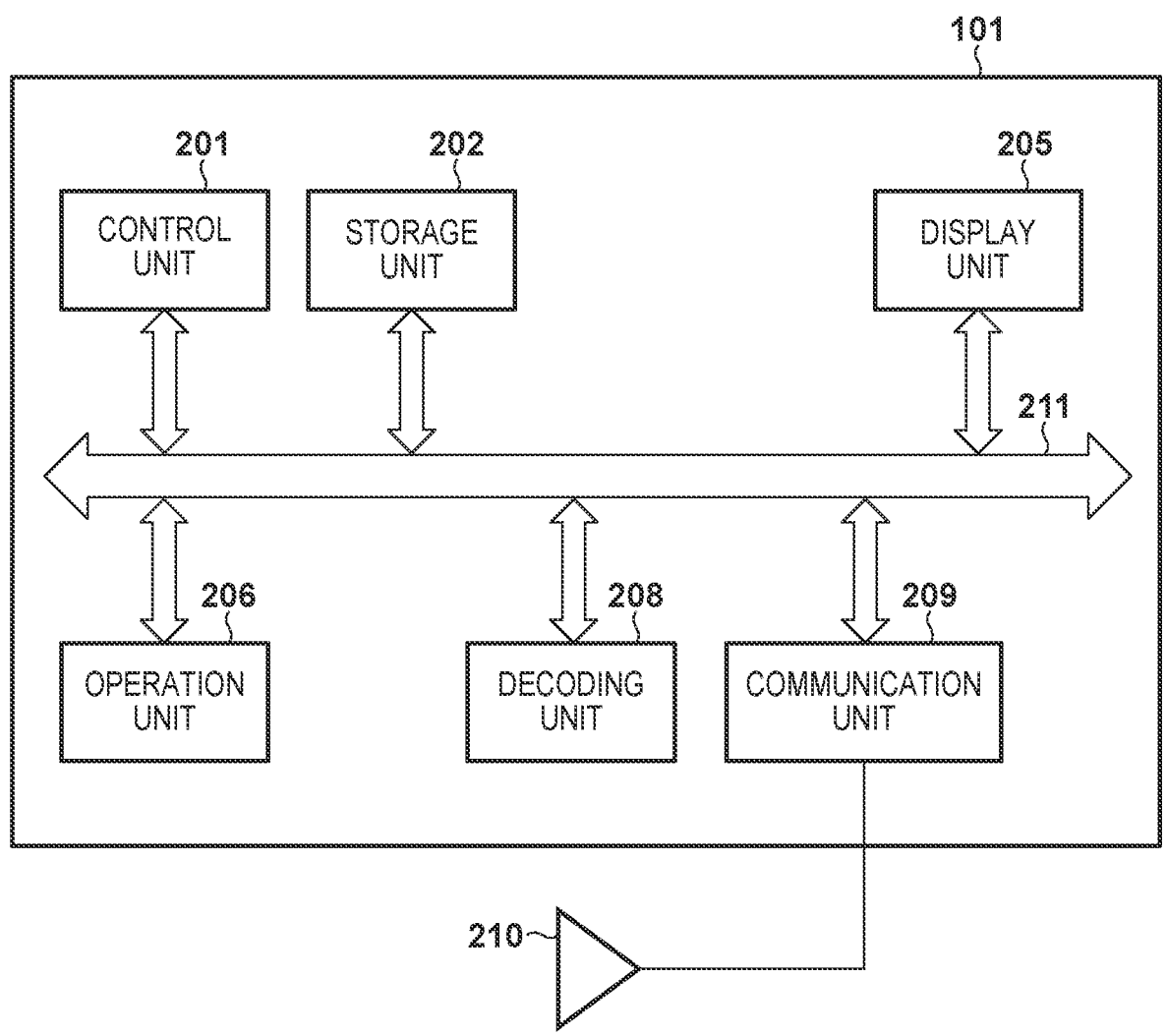
FIG. 3 is a block diagram showing a hardware configuration example of a client.

Embodiments of the present invention will be explained in detail below with reference to the accompanying drawings.

First Embodiment

A communication apparatus and a communication system according to an embodiment of the present invention will be explained in detail below with reference to the accompanying drawings. The following embodiment does not limit the present invention according to the scope of claims, and not all combinations of features explained in the embodiment are necessarily essential to the present invention.

(Configuration of Communication System)

FIG. 1 is a view showing an example of the configuration of a communication system. This communication system includes a server (server apparatus) 102 which provides image data (spatially divided image data) of one or a plurality of partial areas of a plurality of partial areas forming an image, and a client (client apparatus) 101 which receives and plays back the image data. The client 101 is a communication apparatus having a display function, such as a DTV (Digital TV), an HMD (Head-Mounted Display), a smartphone, or a tablet. The client 101 may also be a Web browser on an information processing apparatus such as a smartphone, a tablet, or a PC, or an application installed in the information processing apparatus. The server 102 is an information processing apparatus such as a digital camera, a digital video camera, a network camera, a projector, a cell phone, a smartphone, a PC, or a server apparatus, and functions as a server apparatus as the transmission source of video data as image data. The server 102 is implemented by one PC in this embodiment, but may also be distributed on a cloud. The client 101 and the server 102 are connected to a network 103. This embodiment is not limited by the form of the network 103. For example, the network 103 is connected by a LAN (Local Area Network), a WAN (Wide Area Network), an LTE (Long Term Evolution) as public mobile communication, or a combination thereof. As the LAN, for example, a wired LAN complying with Ethernet®, a wireless LAN complying with the IEEE 802.11 series, or the like is used. IEEE is an abbreviation of Institute of Electrical and Electronics Engineers. As the WAN, the Internet or the like is used. Note that the client 101 and the server 102 may also directly be connected without going through the network 103. For example, the client (communication apparatus) 101 and the server 102 may communicate with each other by using a wireless ad hoc network. In this embodiment, an example in which video data (moving image data) are transmitted and received as image data will be explained. However, it is also possible to transmit and receive still images.

This embodiment will be explained by taking HTTP/2 as an example of a communication protocol. However, the present invention is not limited to this, and SPDY, QUIC, or the like may also be used. QUIC is an abbreviation of Quick UDP Internet Connections. It is also possible to use another protocol which processes a plurality of logical streams on one connection.

HTTP (Hyper Text Transfer Protocol) is one application-layer protocol generally widely used as a standard technique of the Internet. In IETF (Internet Engineering Task Force), HTTP/2 is proposed as the next standard of HTTP/1.1. In HTTP/2, a connection is established between a server apparatus and a client apparatus, and a plurality of independent logical communication sequences (communication paths) called streams can be constructed on the connection. The server apparatus and the client apparatus can exchange messages in each stream.

HTTP/1.1 adopts a framework called an HTTP pipeline in order to enable multiplexing of communication sequences between a client apparatus and a server apparatus. However, this HTTP pipeline has a restriction that the server must return responses in the same order as that of requests. On the other hand, in each stream of HTTP/2, it is possible to communicate requests and responses independently of each other, and a server apparatus can return a response to a client apparatus for which response is possible, regardless of the order of requests. Accordingly, the independence between streams of HTTP/2 is higher than that of the HTTP pipeline.

Also, a client apparatus can set a priority for a stream in HTTP/2. When priorities are set for streams, a server apparatus preferentially processes a stream for which a higher priority is set, and returns a response earlier. Therefore, the quality of a user experience on the client apparatus can be increased by appropriately setting priorities. Furthermore, HTTP/2 additionally has a mechanism such as push communication for transmitting data from a server apparatus without any request from a client apparatus.

In this embodiment, an example in which a segment generating unit 514 of the server 102 (to be described later) uses MPD (Media Presentation Description) defined by MPEG-DASH will be explained. Note that the present invention is not limited to MPD of MPEG-DASH, and a playlist description system such as HLS (Http Live Streaming) may also be used. As will be described later, the playlist is information indicating the content of video data provided by the server 102, more specifically, indicating the spatial divisional configuration of the video data.

MPEG-DASH and HLS are methods of dynamically changing a stream to be obtained in accordance with the ability of a terminal apparatus or a communication status in which the terminal apparatus is placed. DASH is an abbreviation of Dynamic Adaptive Streaming over HTTP, and HLS is an abbreviation of Http Live Streaming. Recently, as terminals such as smartphones and tablets spread, demands for enjoying streaming contents such as live images anytime anywhere by using various terminal apparatuses are increasing. MPEG-DASH and HLS are defined to implement this request. In these methods, video data is divided into segments in fine units of time, and a URL (Uniform Resource Locator) for obtaining a segment is described in a file called a playlist. A receiving apparatus first obtains this playlist, and then obtains desired video data by using information described in the playlist. By describing URLs corresponding to a plurality of versions of video data segments in the playlist, the receiving apparatus can obtain an optimum version of a video data segment in accordance with its own ability and the communication environment.

(Segment)

Next, a practical example of the segment to be obtained will be explained with reference to FIG. 2. In this embodiment, an example in which a user is viewing video data having a low-image-quality layer (base layer) 1001 and a high-image-quality layer (enhancement layer) 1002 will be explained.

Reference numerals 1003, 1005, and 1007 denote states in which video data arranged in a time-series order are played back at individual times. At time i, the user is viewing video data of a low-image-quality layer indicated by 1003. A region of interest is a region (tile No. 11) surrounded by the thick solid line indicated by 1004. Also, peripheral regions (adjacent regions) are partial areas existing in the periphery of the region of interest, and are regions (tiles 7, 10, 12, and 15) surrounded by the dotted lines in the example of FIG. 2. At time j, the user is viewing video data (tile No. 10) of a low-image-quality layer indicated by 1005. A region of interest is a region (tile No. 10) surrounded by the thick solid line indicated by 1006. Peripheral regions are regions (tile Nos. 5, 6, 7, 9, 11, 13, 14, and 15) surrounded by the dotted lines. At time k, the user is viewing video data (tile No. 26) of a high-image-quality layer indicated by 1007. Peripheral regions are regions (tile Nos. 21, 22, 23, 25, 27, 29, 30, and 31) surrounded by the dotted lines.

Note that a region of interest is one tile in this embodiment, but the present invention is not limited to this, and a plurality of tiles may also be regions of interest.

Note also that this embodiment uses two layers, that is, a low-image-quality layer and a high-image-quality layer, but the present invention is not limited to this. For example, it is also possible to use three or more layers including low image quality, intermediate image quality, and high image quality.

Furthermore, the number of divided regions is the same in the low-image-quality layer and the high-image-quality layer in this embodiment, but the present invention is not limited to this. For example, it is also possible to divide the low-image-quality layer into 2×2=4 regions, and divide the high-image-quality layer into 4×4=16 regions. In addition, it is possible to use the low-image-quality layer as one region, and divide the high-image-quality layer into a plurality of regions. It is also possible to use a plurality of layers, and give one region to each layer.

As a coding format of coding video data as explained with reference to FIG. 2, scalable coding systems such as SVC and L-HEVC are available, but the present invention is not limited to these coding systems. SVC is an abbreviation of Scalable Video Coding, and L-HEVC is an abbreviation of Layered-High Efficiency Video Coding. When there is one layer, a system capable of dividing an image into regions, such as HEVC (High Efficiency Video Coding), can be used as the coding system.

(Hardware Configuration of Client)

FIG. 3 is a block diagram showing a hardware configuration example of the client 101. Referring to FIG. 3, a control unit 201 is a central processing unit (CPU) for comprehensively controlling the operation of the client 101, and controls constituent units (202, 205, 206, and 208 to 210) via a system bus 211.

A storage unit 202 stores and manages various kinds of data. The storage unit 202 is implemented by a RAM (Random Access Memory), a ROM (Read-Only Memory), or a storage (for example, a hard disk or an SSD). A display unit 205, for example, has a liquid crystal panel or the like, and displays various kinds of data under the control of the control unit 201. An operation unit 206 accepts operations from the user. The operation unit 206 is implemented by, for example, a touch panel, a pointing device, or a keyboard. A decoding unit 208 performs a video data decoding process. A communication unit 209 controls a wireless LAN interface 210, thereby controlling various communication processes. 210 is a wireless LAN interface. Note that wireless LAN communication is performed via the wireless LAN interface in this embodiment, but the present invention is not limited to this, and communication may also be performed via a wired LAN interface or a public mobile communication interface. Note also that the present invention is not limited to these communication methods, and can also be implemented by another wireless method such as Bluetooth®. A plurality of these interfaces may also be used. Note that in this embodiment, the display unit 205 for displaying video data is included in one hardware. However, the display unit may also be another apparatus connected by HDMI®, for example. This applies to other constituent elements such as the operation unit 206.

(Functional Configuration of Client)

Figure 4:
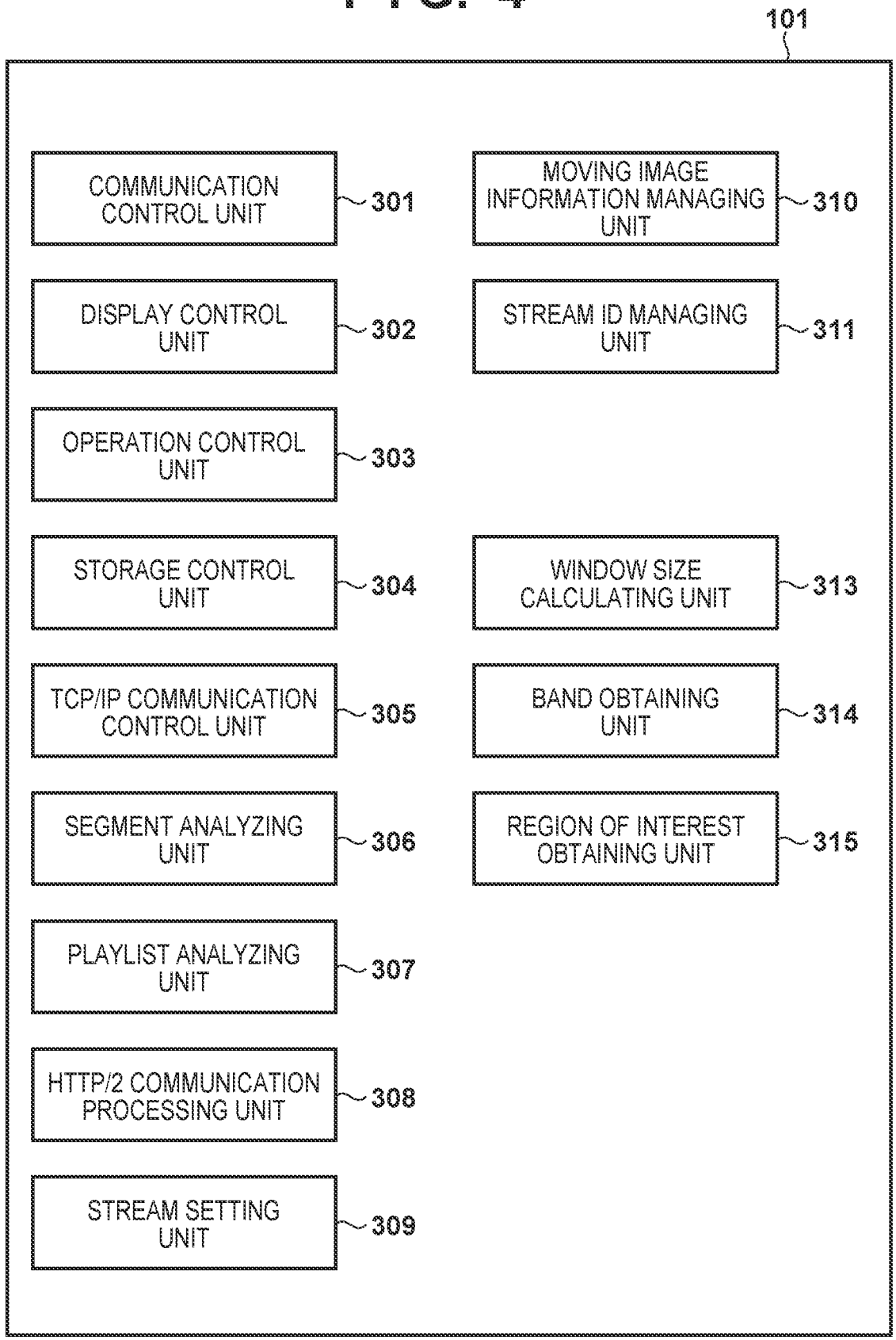
FIG. 4 is a block diagram showing a functional configuration example of the client.

FIG. 4 is a block diagram showing a functional configuration example of the client 101. Note that in this embodiment, the function of each functional block to be presented below is performed by the control unit 201 (a CPU) by executing a software program (computer program) stored in the storage unit 202. However, a part or the whole of each functional block may also be hardware.

Referring to FIG. 4, a communication control unit 301 controls communication via the communication unit 209. A display control unit 302 displays video data obtained from the server 102, via the display unit 205. The display control unit 302 causes the display unit 205 to display a segment decoded by a segment analyzing unit 306 as video data. The display control unit 302 also displays a UI for accepting operations from the user. An operation control unit 303 controls the operation unit 206 and accepts operations from the user. A storage control unit 304 controls the storage unit 202, and stores or deletes data such as processing data or video data.

A TCP/IP communication control unit 305 performs TCP/IP communication control with respect to the server 102 by using the communication unit 209. Note that this embodiment uses TCP/IP communication, but the present invention is not limited to this, and UDP (User Datagram Protocol) may also be used. The segment analyzing unit 306 decodes a segment as video data obtained from the server 102.

A playlist analyzing unit 307 analyzes a playlist obtained from the server 102. A playlist generated by the server 102 complies with MPD defined by MPEG-DASH.

The playlist describes a URL to be accessed to obtain a segment in a specific region having a specific image quality at a specific timing. The playlist also describes information of each region in each layer, such as the bit rate, the coordinates indicting the position of the region, the width of the region, and the height of the region. The playlist may also describe information of the whole video data, such as the number of layers, and the width and height of the whole video data in each layer. Note that information of each tile is described in MPD and transferred to the client in this embodiment, but the present invention is not limited to this method. For example, these parameters may also be obtained by analyzing a file such as an HTML file or a JavaScript file.

An HTTP/2 communication processing unit 308 performs a communication process as a client defined in HTTP/2 (Hyper Text Transfer Protocol Version 2).

A stream setting unit 309 performs setting for controlling a stream. The stream setting unit 309 sets a priority for a stream via the HTTP/2 communication processing unit 308.

The client 101 transmits a priority frame in order to set a priority for a stream. The stream setting unit 309 can set a priority for each of a stream for obtaining a region of interest, a stream for obtaining a peripheral region, and a stream for obtaining another region. The stream setting unit 309 sets the priority of a region of interest to be equal to or higher than that of a peripheral region. For example, the stream setting unit 309 sets priority 16 for a stream for obtaining a region of interest, priority 8 for a stream for obtaining a peripheral region, and priority 1 for a stream for obtaining another region. A region of interest can preferentially be obtained by setting the priority of the region of interest to be higher and larger than that of a peripheral region. Consequently, the region of interest can smoothly be displayed. Note that the values of priority are not limited to those introduced in this example. It is also possible to set a priority for at least one of a plurality of streams.

An example in which a priority is set will be explained in this embodiment, but the present invention is not limited to this, and the dependence between streams may also be set. For example, a stream for obtaining a peripheral region is set to depend on a stream for obtaining a region of interest. When this setting is performed, no transmission is performed in a stream of a peripheral region until a region of interest is obtained. As a consequence, no band is used to obtain the peripheral region until the region of interest is completely obtained. This makes it possible to obtain the region of interest and smoothly display it.

In addition, the stream setting unit 309 sets a push policy for each stream. The HTTP/2 communication processing unit 308 notifies the server of the push policy set by the stream setting unit 309.

The push policy is a well-known technique for performing negotiation between a client and a server about a server's push behavior. The push policy is described in detail in Accept-Push-Policy Header Field (http://tools.ietforg/html/draft-ruellan-http-accept-push-policy-00).

A client transmits a header field "accept-push-policy" to a server. The client sets a server's behavior favorable to the client in this header field and transmits the header field. In response to this push policy received from the client, the server sets a push policy in a header field "push-policy" and transmits the header field. In this embodiment, more detailed stream control can be performed by setting a push policy for each stream. In this embodiment, the client 101 uses the header field "accept-push-policy" for requesting a push policy as an HTTP request, but the name of the header field is not limited to this. Also, "accept-push-policy" can contain one or a plurality of push policies.

The client 101 can request the server 102 to perform no push transmission. In this case, the client 101 uses a push policy "none". The client 101 describes "accept-push-policy:none" when transmitting an HTTP request, thereby requesting the server 102 to perform no push for the corresponding stream. A region of interest can smoothly be obtained by performing setting such that no push transmission is performed for regions other than the region of interest.

The client 101 can request the server 102 to push only metadata contained in a response to the HTTP request. This enables the client 101 to receive, by push, only a response when transmitting the HTTP Head request, that is, only metadata. The client 101 describes "accept-push-policy:head" when transmitting the HTTP request, thereby requesting the corresponding stream of the server 102 to push only metadata. Consequently, the client 101 can obtain the size of a segment to be pushed by the server 102 in advance. Therefore, the client 101 can calculate a necessary network band at higher accuracy. The client 101 can further perform detailed stream control.

The client 101 can request the server 102 to use a default behavior. The client 101 describes "accept-push-policy:default" when transmitting the HTTP request.

Also, the client 101 can set a transmitted stream to be a region of interest, a peripheral region, or another region, by using the push-policy mechanism. When setting the corresponding stream to be a region of interest, the client 101 describes "accept-push-policy:tile:p" when transmitting the HTTP request. Accordingly, the server 102 can determine that the corresponding stream is a region of interest of the client 101. Then, the server 102 can preferentially transmit the region of interest by push. This increases the possibility that video data of the region of interest is smoothly obtained.

When requesting that the corresponding stream is a peripheral region, the client 101 describes "accept-push-policy:tile:s" when transmitting the HTTP request. Accordingly, the server 102 can determine that the corresponding stream is a peripheral region of the client 101. This increases the possibility that a peripheral region is also smoothly obtained when the bandwidth of the network has a margin. A priority (different from the priority of a stream) can be given to a peripheral region. For example, when a region of interest is one tile and eight tiles around it are peripheral regions, different priorities can be given to four tiles in the upper, lower, left, and right positions, and four tiles in the oblique directions.

When the corresponding stream is neither a region of interest nor a peripheral region, the client 101 describes "accept-push-policy:tile:n" when transmitting the HTTP request. Accordingly, the server 102 can determine that the corresponding stream is neither a region of interest nor a peripheral region of the client 101. Therefore, the server 102 can determine not to push a region having low necessity for the client.

The client 101 receives a response to the requested push policy from the server 102. The stream setting unit 309 sets the push policy received from the server 102 as a push policy of the stream.

A moving image information managing unit 310 manages the result of analysis by the playlist analyzing unit 307.

A stream ID managing unit 311 manages a stream identifier (stream ID) of HTTP/2 and a region forming video data by linking them. The stream ID managing unit 311 stores the ID of a stream formed by the HTTP/2 communication processing unit 308 by linking the ID to each region in each layer forming video data. Also, based on a reservation request (PUSH_PROMISE) transmitted from the server 102, the stream ID managing unit 311 stores the ID of a stream for receiving a push for each region in each layer. The processing of the stream ID managing unit 311 makes it possible to manage a stream by which the client 101 leadingly obtains a segment, and a stream for receiving a segment pushed from the server 102. This makes fine stream control possible.

A window size calculating unit 313 calculates a necessary HTTP/2 window size based on the bit rate and length of a segment to be obtained. Note that an example in which the window size is controlled on HTTP/2 will be explained in this embodiment, but a TCP window size may also be controlled.

A band obtaining unit 314 obtains the bandwidth of the network between the client 101 and the server 102. The band obtaining unit 314 can measure the bandwidth of the network by using various measurement protocols, and can also obtain the band by calculating it from the log of communication with the server 102 or a segment transmission log. For example, when a 2-MByte segment is obtained by two seconds in the past, the band obtaining unit 314 obtains a value indicating that the bandwidth of the network is at least (2 MBytes×8 bits)÷ 2 seconds 8 Mbps.

A region of interest obtaining unit 315 obtains a region of interest of the user. The client 101 obtains a region of interest of the user from a user's operation. Note that when the client 101 is an apparatus such as a smartphone having the function of an acceleration sensor, a region of interest may also be obtained from a position at which the user inclines the smartphone. Note that when the client 101 is an apparatus such as HMD, a user's region of interest may also be obtained by using the angle of a user's viewpoint, various kinds of information from an acceleration sensor and the like, or a combination thereof.

(Hardware Configuration of Server)

Figure 5:
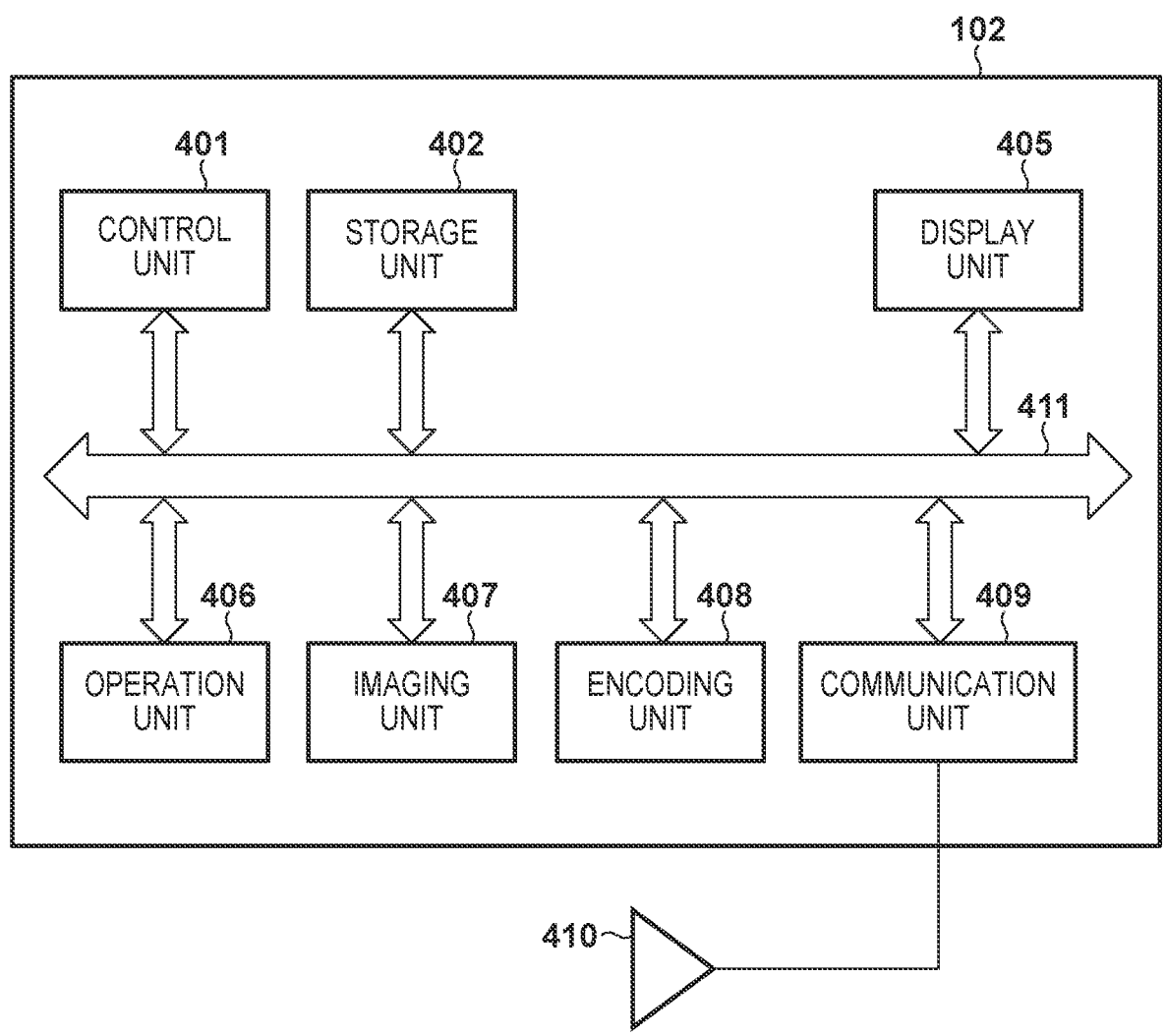
FIG. 5 is a block diagram showing a hardware configuration example of a server.

FIG. 5 is a block diagram showing a hardware configuration example of the server 102. Referring to FIG. 5, a control unit 401 is a central processing unit (CPU) for comprehensively controlling the operation of the server 102, and controls constituent units (402 and 405 to 409) via a system bus 411.

A storage unit 402 stores and manages various kinds of data. The storage unit 402 is implemented by a RAM (Random Access Memory), a ROM (Read-Only Memory), or a storage (for example, a hard disk or an SSD). A display unit 405 has a liquid crystal panel or the like, and displays various contents under the control of the control unit 401. An operation unit 406 accepts operations from the user. The operation unit 406 is implemented by, for example, a touch panel, a pointing device, or a keyboard. An imaging unit 407 obtains video data by imaging. An encoding unit 408 performs a video data encoding process. A communication unit 209 controls a wired LAN interface 410, thereby controlling various communication processes. 410 is a wired LAN interface. Note that the communication control unit controls the wired LAN interface in this embodiment, but the present invention is not limited to this, and communication may also be performed by controlling a wireless LAN interface or a public mobile communication interface. Note also that the present invention is not limited to these communication methods, and can also be implemented by another communication method such as Bluetooth®. Note that the server 102 includes the imaging unit 407 in this embodiment, but the server 102 may also obtain video data from another apparatus. Note also that the server 102 includes the encoding unit 408 in this embodiment, but the server 102 may also obtain encoded data from another apparatus. Constituent elements such as the display unit 405 and the operation unit 406 may also be other apparatuses connected by cables or the like.

(Functional Configuration of Server)

Figure 6:
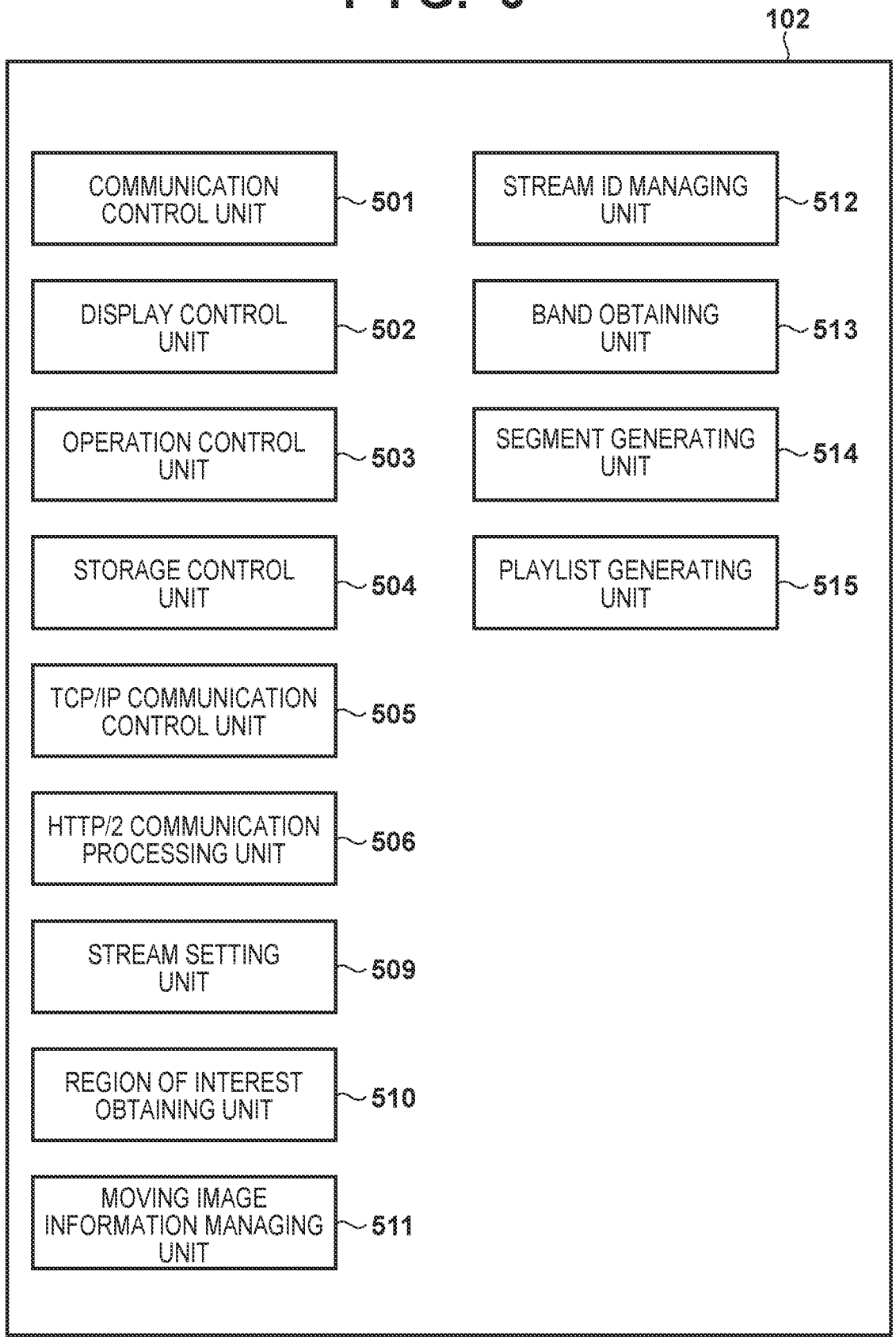
FIG. 6 is a block diagram showing a functional configuration example of the server.

Referring to FIG. 6, a communication control unit 501 controls communication via the communication unit 409. A display control unit 502 can display a UI for accepting operations from the user via the display unit 405. An operation control unit 503 controls the operation unit 406 and accepts operations from the user. A storage control unit 504 controls the storage unit 402, and stores or deletes data such as processing data or video data.

A TCP/IP communication control unit 505 performs TCP/IP communication control with respect to the client 101 by using the communication unit 409. Note that this embodiment uses TCP/IP communication, but the present invention is not limited to this, and UDP (User Datagram Protocol) may also be used. An HTTP/2 communication processing unit 506 performs a communication process as a server defined in HTTP/2 (Hyper Text Transfer Protocol Version 2).

A stream setting unit 509 sets a priority for a stream based on an HTTP/2 priority frame received from the client 101.

The stream setting unit 509 also sets a stream push policy based on a push policy contained in an HTTP request received from the client 101.

The stream setting unit 509 describes a push policy selected by the server 102 in an HTTP response to the client 101. In this embodiment, the server 102 uses a header field "push-policy" for describing a push policy in the HTTP response. Although this embodiment uses a push policy, the present invention is not limited to this, and this embodiment can be implemented by using a method of notifying whether to push a stream.

The server 102 notifies the client 101 not to perform push transmission. In this case, the server 102 uses a push policy "none". The server 102 describes "push-policy: none" when transmitting an HTTP response, thereby notifying the client 101 not to perform push in the corresponding stream.

The server 102 notifies the client 101 to push only metadata of the HTTP response.

The server 102 transmits, by push, only a response to the HTTP Head request, that is, only metadata. The server 102 describes "push-policy: head" when transmitting the HTTP response, thereby notifying the corresponding stream to push only metadata.

When notified by the client to use a default push policy, the server 102 selects a push policy which the server uses, and notifies the client of the selected push policy.

When the client 101 requests a push policy for setting a region of interest, the server 102 determines that a region linked to the corresponding stream is the region of interest.

The server 102 describes "push-policy: tile: p" when transmitting an HTTP response to the client, thereby notifying the client that the request is accepted.

When the client 101 requests a push policy for setting a peripheral region, the server 102 determines that a region linked to the corresponding stream is the peripheral region. The server 102 describes "accept-push-policy: tile: s" when transmitting an HTTP response to the client, thereby notifying the client that the request is accepted.

When the client 101 requests a push policy for setting the corresponding stream to be neither a region of interest nor a peripheral region, the server 102 determines that a region linked to the corresponding stream is neither a region of interest nor a peripheral region. The server 102 describes "accept-push-policy: tile: n" when transmitting an HTTP response to the client, thereby notifying the client that the request is accepted.

Note that the types of push policy and the description method are not limited to those introduced in this embodiment. If the client 101 requests a plurality of push policies, the server 102 selects a push policy supported by the server. If the server 102 does not support a push policy requested by the client 101, the server 102 may also notify the client 101 of a push policy supported by the server 102. Note that when the server 102 performs no push for the corresponding stream, the server 102 can transmit "none" regardless of a push policy request from the client. Even when the client transmits no push policy, the server 102 can notify the client of its own policy.

A region of interest obtaining unit 510 obtains a region selected as a region of interest by the client 101. The region of interest obtaining unit 510 obtains, as a region of interest, a tile corresponding to a segment by which the client 101 transmits an HTTP request. Note that the present invention is not limited to this method, and a region of interest may also be determined from a push policy. A region of interest may also be obtained by using an HTTP header field contained in an HTTP request from the client.

A moving image information managing unit 511 manages various kinds of information such as the number of regions forming video data related to a playlist generated by a playlist generating unit 515, the number of layers of the video data, the width and height of the video data, the width and height of each region, and the bit rate of each region. A stream ID managing unit 512 manages a stream identifier (stream ID) of HTTP/2 and a region forming video data by linking them. Also, based on a reservation request (PUSH_PROMISE frame) transmitted from the server 102, the stream ID managing unit 512 stores the ID of a stream for transmitting a push for each region in each layer. A band obtaining unit 513 obtains the bandwidth of the network between the client 101 and the server 102. The band obtaining unit 513 can measure the bandwidth of the network by using various measurement protocols, and can also obtain the band by calculating it from the log of communication with the client 101 or a segment transmission log. A segment generating unit 514 encodes video data obtained by the imaging unit 407 via the encoding unit 408. Then, based on the video data encoded by the encoding unit 408, the segment generating unit 514 generates a segment as a unit of video data transmission. Note that ISOBMFF (ISO Base Media File Format) is used as a segment file format in this embodiment, but the present invention is not limited to this, and it is also possible to use MPEG2TS or another method. The playlist generating unit 515 generates a playlist describing a URL (Uniform Resource Locator) which enables access to the segment generated by the segment generating unit 514.

The playlist generating unit 515 generates a playlist which the client uses to obtain video data. In a playlist to be generated, or in a playlist, the playlist generating unit 515 describes information such as the bit rate of each region in each layer, the coordinates indicating the position of the region, the width of the region, and the height of the region.

The playlist may also describe information of the whole video data, such as the number of layers, and the width and height of the whole video data in each layer. Note that in this embodiment, information of each region in each layer is described in the playlist. However, the present invention is not limited to this, and the information may also be described in an HTML file or a JavaScript file.

(Operation of Client)
Overall Processing of Client

Figure 7B:
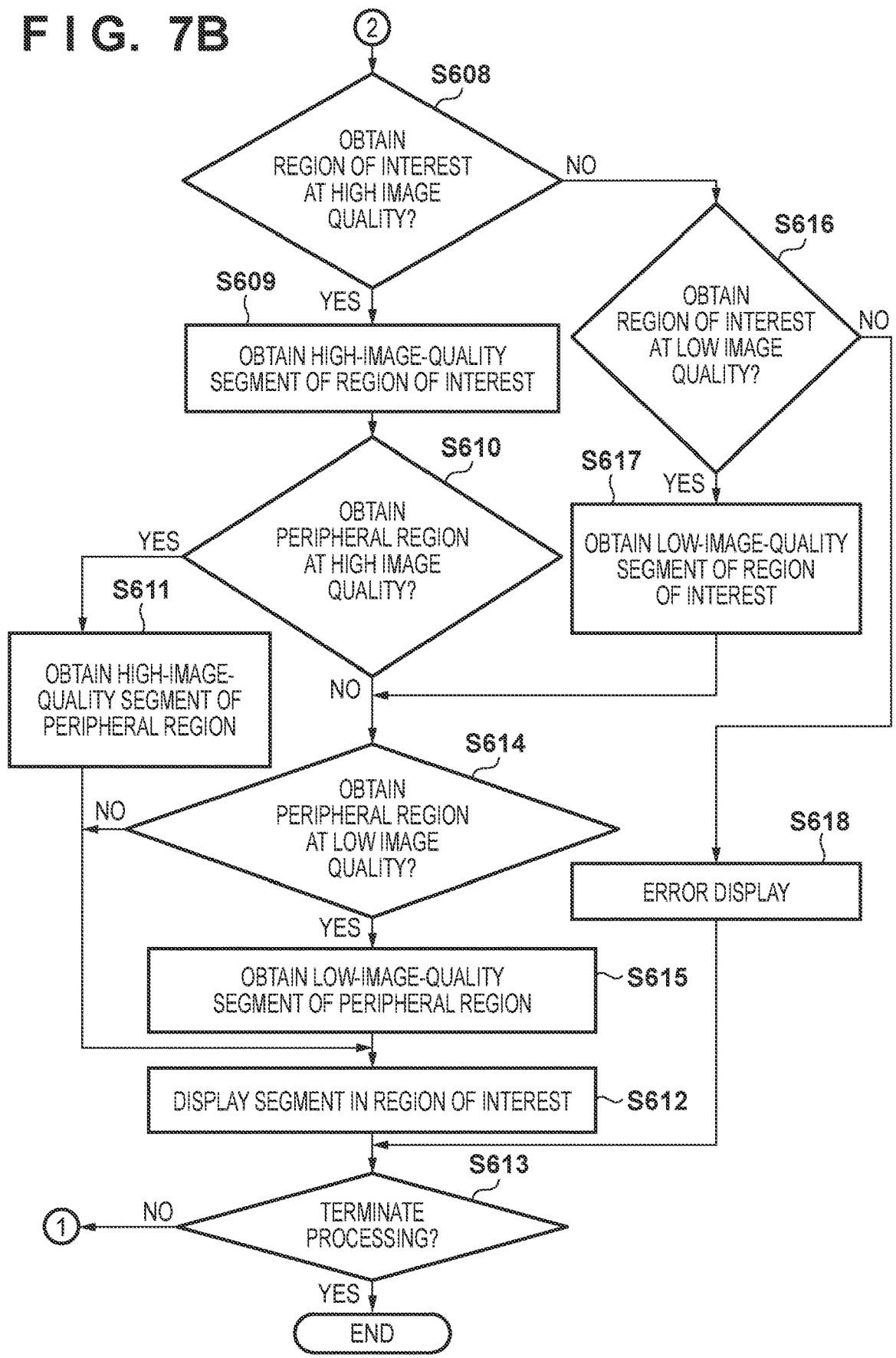
FIG. 7B is a flowchart showing the operation of the client.

The operations of the client 101 and the server 102 of this embodiment including the arrangements as described above will be explained below. First, a segment obtaining operation (the overall processing) of the client 101 will be explained in detail below with reference to flowcharts shown in FIGS. 7A and 7B. Each step in FIGS. 7A and 7B is executed under the control of the control unit 201 (a CPU) of the client 101.

In this embodiment, video data having low-image-quality and high-image-quality layers and regions as shown FIG. 2 will be explained. Note that the number of regions is not limited to the number of divisions as shown in FIG. 2. For example, a region may also be divided into 2×2, 2×3, or 4×4.

First, the HTTP/2 communication processing unit 308 establishes an HTTP/2 connection to the server 102 (step S601).

The client 101 obtains a playlist from the server 102 via the HTTP/2 communication processing unit 308 (step S602). The playlist analyzing unit 307 analyzes the obtained playlist (step S603). The playlist analyzing unit 307 analyzes the playlist, and obtains information such as the bit rate corresponding to each region in each layer, the coordinates indicating the position of the region, the width of the region, and the height of the region. The moving image information managing unit 310 stores the information obtained by the playlist analyzing unit 307.

The client 101 forms an HTTP/2 stream for each region in each layer via the HTTP/2 communication processing unit 308 (step S604). The client 101 forms an HTTP/2 stream for each region in each layer. The stream ID managing unit 311 stores each region in each layer and the stream ID by linking them (step S605). Also, when receiving a reservation request (PUSH_PROMISE) for reserving a push stream from the server 102, the stream ID managing unit 311 stores the ID of the stream for receiving a push by linking it to each region in each layer.

In the HTTP/2 standard, a reservation request is associated with a stream formed by a client. Therefore, a region to which the push-receiving stream corresponds is specified from a stream with which the push reservation request is associated.

FIG. 8 shows examples of linking between the stream ID managed by the stream ID managing unit 311 and each region in each layer. 8A in FIG. 8 shows regions divided into nine tiles in a high-image-quality layer. Tile Nos. a to i are assigned to the divided regions. A table of 8B in FIG. 8 shows an example in which HTTP/2 stream IDs are assigned to the regions divided into tiles shown in 8A of FIG. 8. In 8B of FIG. 8, a(11, 12) indicates that the client 101 forms a stream having stream ID 11 for the tile a in order to obtain a segment, and the server 102 forms a stream having ID 12 in order to transmit the segment by push. 8C in FIG. 8 shows regions divided into nine tiles in a low-image-quality layer. Tile Nos. j to r are assigned to the divided regions. 8D in FIG. 8 shows an example in which HTTP/2 stream IDs are assigned to the regions divided into tiles in 8C of FIG. 8.

Note that the client 101 forms a stream for each region in each layer in this embodiment, but the present invention is not limited to this. For example, one stream may also be allocated to a plurality of regions. Referring to the example of 8A in FIG. 8, the tiles a, b, and c may also be managed by one stream. This reduces the number of streams to be managed by the client 101, thereby reducing the processing load. It is also possible to allocate the same region in a plurality of layers to one stream. Referring to the examples shown in FIG. 8, the tiles a and j may also be linked to the same stream.

The region of interest obtaining unit 315 obtains a region of interest to be displayed (step S606). The region of interest can include a plurality of tile regions. Also, tiles designated by the region of interest can include both low-image-quality (base layer) tiles and high-image-quality (enhancement layer) tiles.

The client 101 notifies the server 102 of the region of interest. The client may also notify the server of the region of interest by an HTTP GET request. In this case, the client transmits an HTTP HEAD request for a peripheral region in order to distinguish between the region of interest and the peripheral region. Furthermore, the client may also describe the notification of the region of interest to the server in an HTTP header field contained in the HTTP request. For example, the client can notify the server of the region of interest by describing "set-tile:p" when notifying the region of interest, "set-tile:s" when notifying the peripheral region, and "set-tile:n" when notifying another region. Note that when using these header fields, only metadata from the server 102 can be received by transmitting an HTTP Head request. As a consequence, the amount of data to be received between the client 101 and the server 102 can be reduced. Note that the method of describing the header field by which the client 101 notifies the server 102 of the region of interest is not limited to the method introduced in this embodiment.

The stream setting unit 309 performs setting for stream control on the HTTP/2 stream (step S607). The stream setting unit 309 can skip this processing if the region of interest obtained in step S606 remains unchanged from the region of interest obtained last time.

More specifically, the stream setting unit 309 sets priorities for the region of interest and the peripheral region. That is, the stream setting unit 309 sets a priority for at least one of a plurality of streams so that the priority of a stream for communicating image data of the region of interest becomes higher than that of a stream for communicating image data of a partial area other than the region of interest. For example, when the bit rate of the region of interest is 8 Mbps and that of the peripheral region is 1 Mbps, the stream setting unit 309 sets priority 8 for the region of interest, priority 1 for the peripheral region, and priority 0 for other regions. Also, the stream setting unit 309 reflects the set priorities on an HTTP stream via the HTTP/2 communication processing unit 308. The stream setting unit 309 sets the values of priorities set for the region of interest and the peripheral region on the HTTP/2 stream. The priority for the HTTP/2 stream is not limited to this. This increases the possibility that a segment of the region of interest is preferentially obtained.

Then, the stream setting unit 309 performs a push policy request for one or a plurality of streams. Note that this process may also be skipped if the region of interest remains unchanged. Note also that even when the region of interest remains unchanged, this process can be performed if it is necessary to change the setting of the push policy of a stream. The stream setting unit 309 sets a push policy for each stream based on a response from the server 102. By thus setting the push policy, it is possible to receive a push for the region of interest and not to receive a push for the peripheral region, that is, it is possible to perform more detailed control.

The client 101 determines whether to obtain the region of interest with high image quality (step S608). Details of the process of determining whether to obtain the region of interest with high image quality will be described later with reference to FIG. 10. If the client 101 determines to receive the region of interest with high image quality (YES in step S608), the client 101 starts obtaining high-image-quality segment in the region of interest (step S609). Details of the process of obtaining a high-image-quality segment in the region of interest will be described later with reference to FIG. 11.

Then, the client 101 determines whether to obtain the peripheral region with high image quality (step S610). Details of the process of determining whether to obtain the region of interest with high image quality will be described later with reference to FIG. 10. Note that when the peripheral region includes a plurality of tiles, the client 101 may also obtain some tiles with high image quality and obtain the rest with low image quality. For example, when the region of interest is one tile and eight tiles exist in the upper, lower, left, right, upper right, lower right, lower left, and upper left positions around the region of interest, the client 101 can obtain the upper, lower, left, and right tiles with high image quality, and obtain the four remaining tiles with low image quality. If the client 101 determines to obtain the peripheral region with high image quality (YES in step S610), the client 101 starts obtaining a high-image-quality segment in the peripheral region (step S611). Details of the process of obtaining a high-image-quality segment in the peripheral region will be described later with reference to FIG. 11. The display control unit 302 displays data decoded by the segment analyzing unit 306 on the display unit 205 (step S612).

Note that in this embodiment, the process (step S612) of displaying the segment in the region of interest is performed after the process (steps S610, S611, and S615) of obtaining the segment in the peripheral region is performed. However, these processes may also be performed in parallel. That is, when the client 101 obtains the region of interest from the server, the display control unit 302 can perform the display process.

If the client 101 determines not to obtain the peripheral region with high image quality (NO in step S610), the client 101 determines whether to obtain the peripheral region with low image quality (step S614). Details of the process of determining whether to obtain the peripheral region with low image quality will be described later with reference to FIG. 10. If the client 101 determines to obtain the peripheral region with low image quality (YES in step S614), the client 101 obtains a low-image-quality segment of the peripheral region (step S615). Details of the process of obtaining the low-image-quality segment of the peripheral region will be described later with reference to FIG. 11. Then, the segment of the region of interest is displayed (step S612). If the client 101 determines not to obtain the peripheral region with low image quality (NO in step S614), the client 101 displays the region of interest (step S612).

After completing the process in step S612, the client 101 determines whether to terminate the video data obtaining process (step S613). If the client 101 determines to terminate the video data obtaining process (YES in step S613), the client 101 terminates the process according to this flowchart. If the client 101 determines not to terminate the video data obtaining process (NO in step S613), the client 101 advances to step S606.

If the client 101 determines not to obtain the region of interest with high image quality (NO in step S608), the client 101 determines whether to obtain the region of interest with low image quality (step S616). The process of determining whether to obtain the region of interest with low image quality by the client 101 will be described later with reference to FIG. 10. If the client 101 determines to obtain the region of interest with low image quality (YES in step S616), the client 101 obtains a low-image-quality segment in the region of interest (step S617). Details of the process of obtaining the low-image-quality segment in the region of interest by the client 101 will be described later with reference to FIG. 11. Then, the process advances to step S614.

If the client 101 determines not to obtain a low-image-quality segment of the region of interest (NO in step S616), error display is performed (step S618). For example, a message "obtaining of video data is delayed due to the status of the channel" is displayed. After that, the process advances to step S613.

In this embodiment as described above, the client 101 receives and obtains video data of a region of interest preferentially to video data of regions other than the region of interest. More specifically, this embodiment adopts the following methods.

After receiving video data of a region of interest, the client 101 receives video data of a partial area other than the region of interest.

The client 101 obtains the band of the network between the server 102 and the client 101 (band obtaining), and obtains the bit rate of a partial area of video data (bit rate obtaining). Then, based on the comparison of the band of the network with the bit rate of the partial area, the client 101 determines the image quality of the partial area of video data to be received, and receives video data of a partial area having the image quality.

When determining the image quality of the partial area of video data to be received, the client 101 determines to receive a region of interest with image quality higher than that of a partial area other than the region of interest.

Furthermore, based on the comparison of the band of the network with the bit rate of the partial area, the client 101 determines whether to receive video data of the partial area. In this case, the client 101 determines to receive the video data of the partial area other than a region of interest if the band of the network has a margin even after video data of the region of interest is received, and determines not to receive the video data of the partial area other than the region of interest if the band of the network has no margin.

By using these methods, even when the band of the network is limited, the client 101 can preferentially obtain a region of interest, so the user can smoothly view a region having a higher importance of the whole image.

Processing when Region of Interest is Changed

Figure 9:
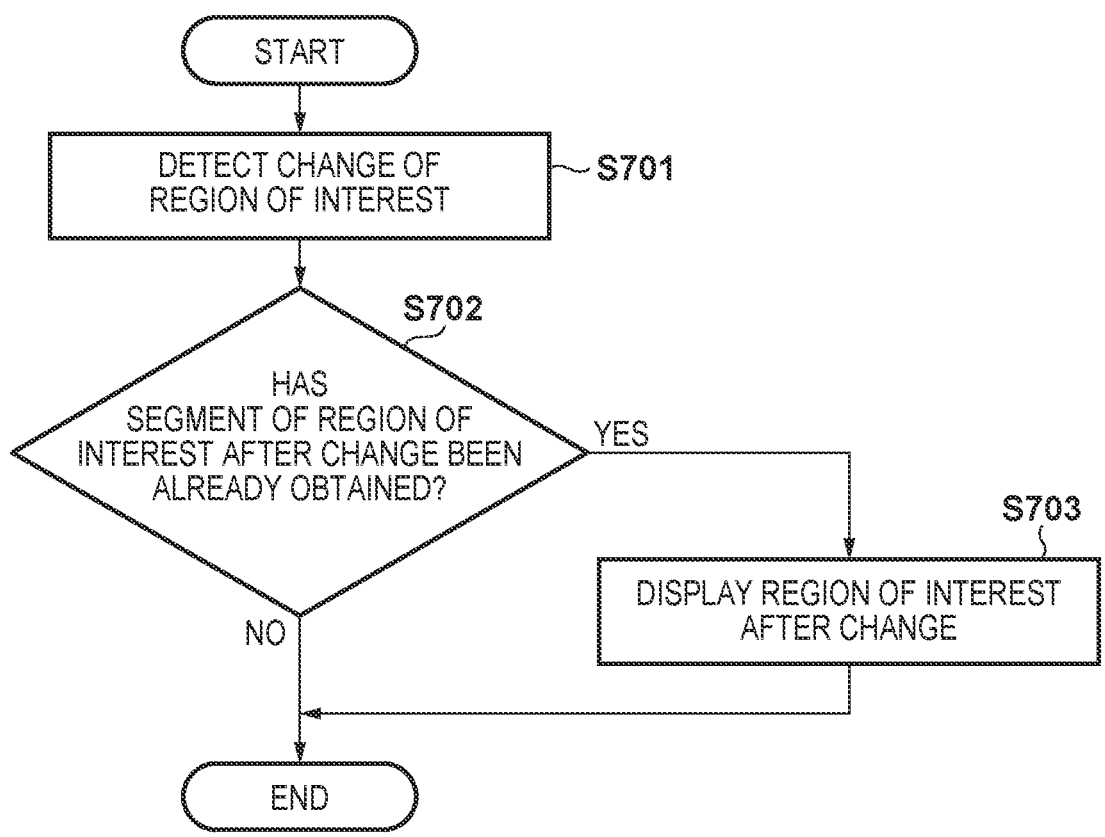
FIG. 9 is a flowchart showing the operation of the client.

In step S606 of FIG. 7A, the process of obtaining a region of interest by the user is periodically performed. Next, processing when a region of interest is changed will be explained with reference to FIG. 9.

The region of interest obtaining unit 315 obtains information indicating that a region of interest is changed from the current region of interest (step S701). The client 101 determines whether a segment of the changed region of interest is already obtained (step S702). If the client 101 determines that the segment of the changed region of interest is already obtained (YES in step S702), the display control unit 302 displays video data of the changed region of interest on the display unit 205 (step S703). Accordingly, if a segment of a peripheral region other than a region of interest is obtained or a segment having a different image quality in the same region of interest is obtained, the client 101 can display video data without obtaining any new segment. This increases the possibility that the user can seamlessly view video data. If the client 101 determines that the segment of the changed region of interest is not already obtained (NO in step S702), and if the process in step S703 is terminated, the processing of this flowchart is terminated.

Segment Obtaining Determination Process

Figure 10:
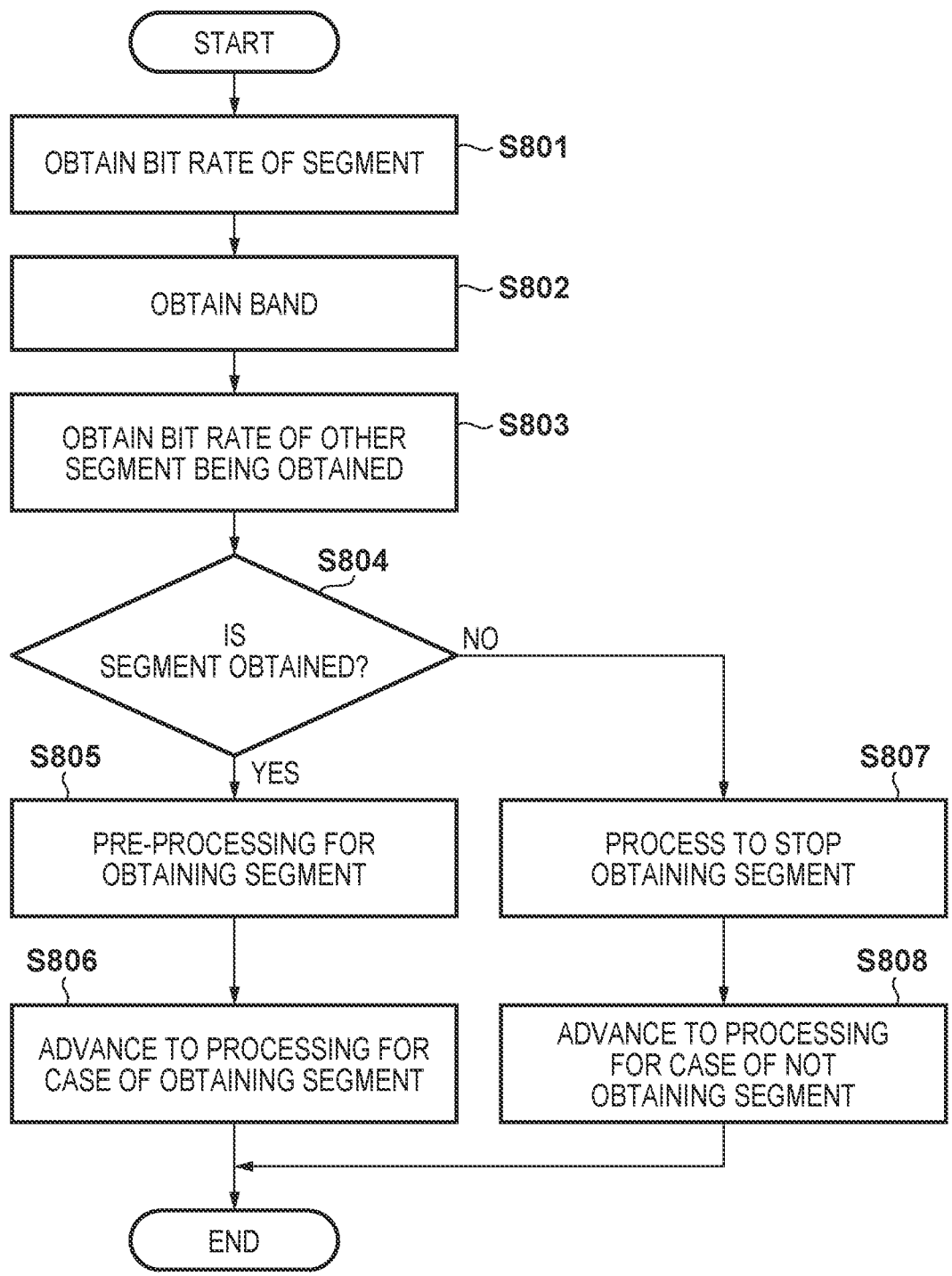
FIG. 10 is a flowchart showing the operation of the client.

FIG. 10 is a flowchart called from each of steps S608, S610, S614, and S616 in FIG. 7B. In this flowchart, whether to obtain a region designated by the caller of FIG. 10 with a designated image quality is determined.

In step S608, a region of interest is designated as a region, high image quality is designated as image quality, and the flowchart of FIG. 10 is called. In step S610, a peripheral region is designated as a region, high image quality is designated as image quality, and the flowchart of FIG. 10 is called. In step S614, a peripheral region is designated as a region, low image quality is designated as image quality, and the flowchart of FIG. 10 is called. In step S616, a region of interest is designated as a region, low image quality is designated as image quality, and the flowchart of FIG. 10 is called.

The client 101 obtains the bit rate of a region for which whether to obtain is determined (step S801). If the designated region includes a plurality of regions, the client 101 obtains the sum of the bit rates of the plurality of regions. Note that the client 101 may also obtain the size of a segment of the corresponding region by transmitting an HTTP HEAD request. The client 101 may also obtain the bit rate by dividing the obtained segment size by the segment time. Furthermore, if the client 101 transmits a push policy (push-head) to the server 102, the client 101 can obtain a file size contained in a response to the Head request from the server 102.

The band obtaining unit 314 obtains the band of the network between the server 102 and the client 101 (step S802). The client 101 obtains the bit rate of another segment currently being obtained (step S803).

If the flowchart of FIG. 10 is called in order to determine whether a peripheral region is obtainable (step S610 or S614), the bit rate of the obtained segment of the region of interest is obtained (step S609 or S617). Note that it is also possible to obtain the bit rate by a calculation from a file size currently being obtained, not from the bit rate.

The client 101 determines whether to obtain a segment (step S804). For example, the client 101 can determine to obtain a segment if a usable communication band is equal to or higher than the bit rate of the segment, and can determine not to obtain a segment if the band is lower than the bit rate. More specifically, for example, when the bit rate of a segment to be obtained is 8 Mbps and the band is 10 Mbps, the bandwidth is larger than the bit rate, so the client 101 determines to obtain the segment. As another example, when the bit rate of a segment to be obtained is 8 Mbps and the band is 6 Mbps, the bandwidth is smaller than the bit rate, so the client 101 determines not to obtain the segment.

If the client 101 determines to obtain the segment (YES in step S804), the client 101 performs pre-processing for obtaining the segment (step S805). More specifically, the HTTP/2 communication processing unit 308 transmits an HTTP/2 window update (WU:WINDOW UPDATE) frame to the HTTP/2 connection and a stream linked to the corresponding region. In this window update frame, segment length×bit rate can be described as the value of the window size to be added. However, the present invention is not limited to this. For example, when the file size of the segment is obtained, it is also possible to directly describe the value of the file size as the window size to be directly added in the window update frame and transmit the frame. Alternatively, a value larger than the file size may also be described in the window update frame. Examples are two-fold and threefold values of the file size. This makes it possible to collect window updates necessary to obtain a plurality of segments into one. As a result, the amount of data exchange between the client and the server can be reduced.

Also, if the next segment can be received without transmitting the window update frame, the window update frame need not be transmitted. Note that a new stream can be formed if the HTTP/2 stream linked to the corresponding region is closed.

Then, the client 101 advances to processing for a case in which the client 101 determines to obtain the segment (step S806). For example, if this flowchart is called from step S608, the process advances to step S609.

On the other hand, if in step S804 the client 101 determines not to obtain the segment (NO in step S804), the client performs a process of stopping obtaining the segment (step S807). The client stops transmitting the window update frame to the corresponding stream. For example, it is possible to close the corresponding stream by transmitting a GOAWAY frame to the stream. Consequently, the processing load can be reduced by closing an unused stream. It is also possible to transmit a push policy to the server, thereby performing setting so as not to transmit a push to a stream corresponding to the region. This makes it possible to stop the transmission of an unnecessary push from the server 102, and save the bandwidth of the network. This increases the possibility that the segment is smoothly obtained.

The client 101 advances to processing for a case in which the client 101 determines not to obtain the segment (step S808). For example, if this flowchart is called from step S608, the process advances to step S616. In the processing shown in FIG. 10, a buffer capacity to be allocated to a stream for communicating image data of a region of interest becomes larger than a buffer capacity to be allocated to a stream for communicating image data of a region other than the region of interest. By thus controlling the window size, image data of a region of interest can be communicated preferentially to image data of a partial area other than the region of interest.

Segment Obtaining Process

Figure 11:
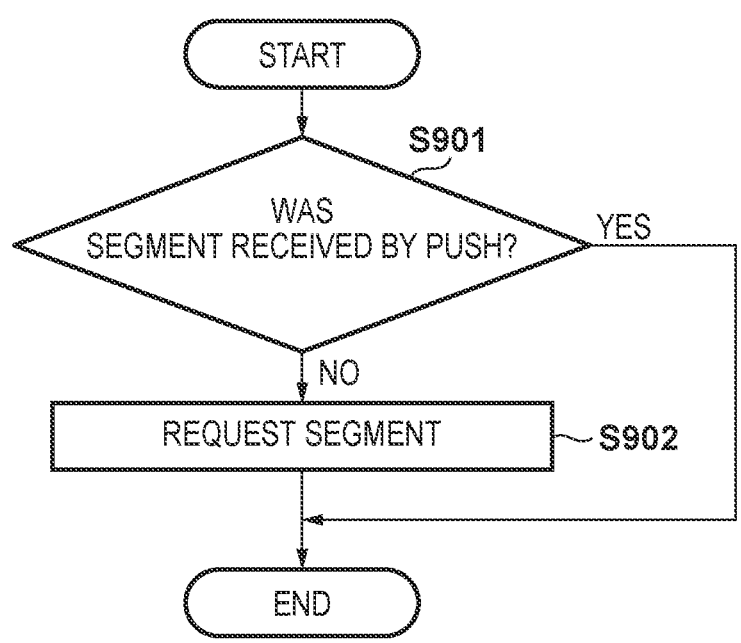
FIG. 11 is a flowchart showing the operation of the client.

A segment obtaining process will be explained with reference to FIG. 11. This flowchart is called from steps S609, S611, S615, and S617 in FIG. 7B. In FIG. 11, a process of obtaining a region designated by the caller of this flowchart with a designated image quality is performed.

In step S609, a region of interest is designated as a region, high image quality is designated as image quality, and this flowchart is called. In step S611, a peripheral region is designated as a region, high image quality is designated as image quality, and this flowchart is called. In step S615, a peripheral region is designated as a region, low image quality is designated as image quality, and this flowchart is called. In step S617, a region of interest is designated as a region, low image quality is designated as image quality, and this flowchart is called.

The client 101 determines whether a segment to be obtained is pushed from the server (step S901). If the client 101 determines that the segment to be obtained is pushed from the server (YES in step S901), the client 101 terminates this flowchart without performing any processing. As a result of this processing, the client need not perform a process of transmitting a new HTTP request if the segment is already received by push. Therefore, the processing load on the client 101 and the load on the network can be reduced. If the client 101 determines that the segment to be obtained is not pushed from the server (NO in step S901), the client 101 requests the segment by transmitting an HTTP request to the server 102 (step S902).

(Operation of Server)

Overall Processing of Server

Figure 12B:
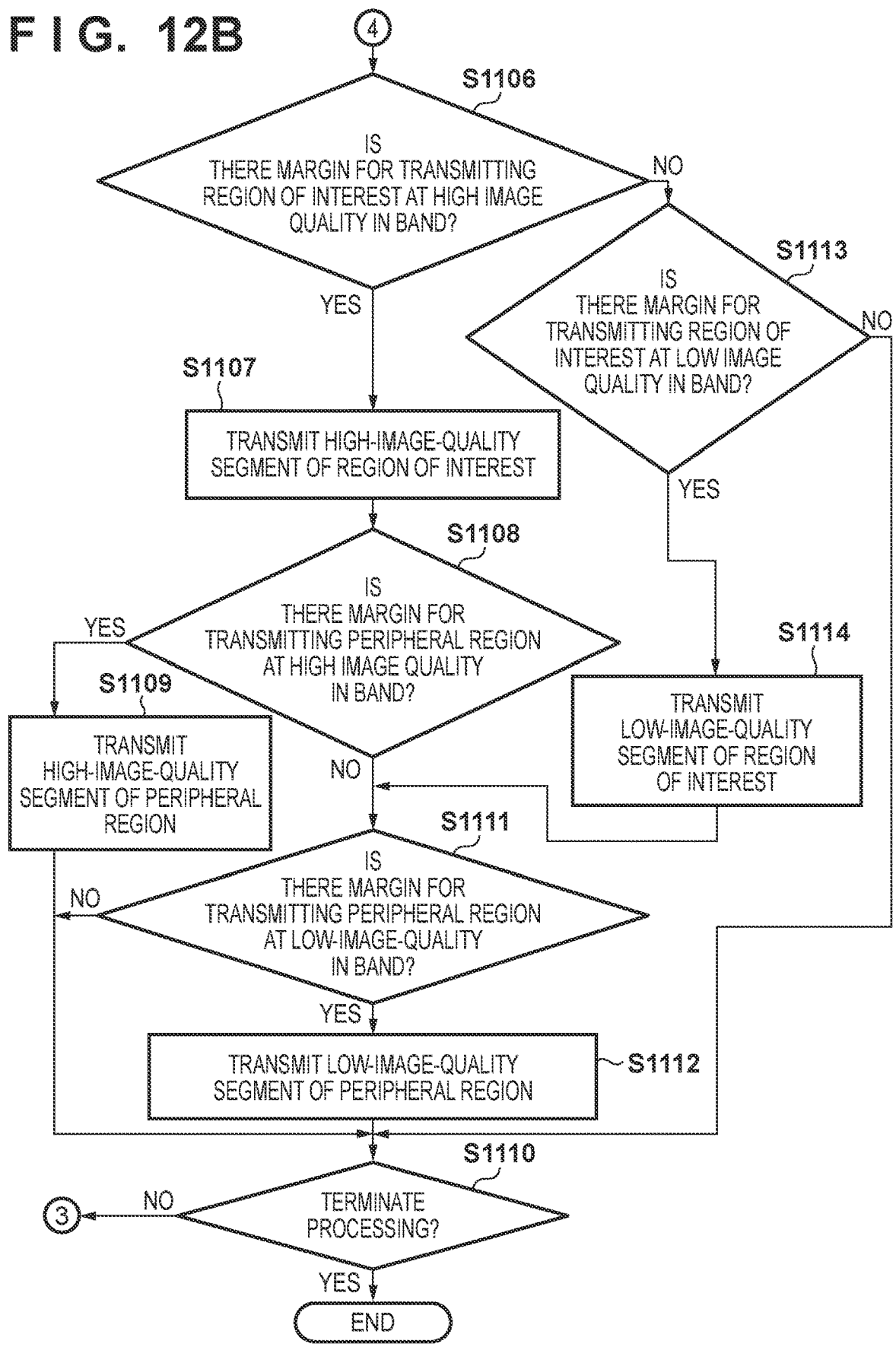
FIG. 12B is a flowchart showing the operation of the server.

The operation of the server 102 having the configuration as shown in FIG. 6 will be explained in detail below with reference to flowcharts shown in FIGS. 12A and 12B. Each step in FIGS. 12A and 12B is executed under the control of the control unit 401 (a CPU) of the server 102.

The HTTP/2 communication processing unit 506 establishes an HTTP/2 connection to the client 101 (step S1101). The server 102 transmits a playlist generated by the playlist generating unit 515 via the HTTP/2 communication processing unit 506 (step S1102).

The HTTP/2 communication processing unit 506 forms a stream (step S1116). The client 101 forms an HTTP/2 stream for each region in each layer. The HTTP/2 communication processing unit 506 forms a stream for performing push transmission from the server. The server 102 transmits a reservation request (PUSH_PROMISE frame) for reserving a push stream, for some or all of the streams formed by the client 101.

Note that the reservation request streams from the server 102 need not be in one-to-one correspondence with streams linked to tiles of the client 101. For example, the client 101 forms a stream for each region, but the server 102 can form only one push stream. Consequently, the server 102 can reduce the number of streams, and reduce the processing load. In addition, the server 102 may form a stream for pushing the segment of the region of interest and a stream for pushing the segment of the peripheral region. Consequently, the server 102 can reduce the number of streams, and reduce the processing load. Also, the server 102 need not form push streams for all regions. The server 102 need not form a push stream. For example, the server 102 can form streams for only a region of interest and a peripheral region obtained from the client 101. Accordingly, the server 102 can reduce the number of streams, and reduce the processing load.

The stream ID managing unit 512 stores each region in each layer and the ID of a stream by linking them (step S1103). The stream ID managing unit 512 also stores a stream ID, which is reserved by the server 102 by transmitting a push reservation request, and each region in each layer by linking them. This processing of the stream ID managing unit 512 makes it possible to separately manage and control a stream by which the client 101 leadingly obtains a segment, and a stream for receiving a segment pushed by the server. As a consequence, fine stream control can be performed.

The region of interest obtaining unit 510 obtains a region of interest of the client 101 (step S1104). That is, the region of interest obtaining unit 510 performs an accepting process of accepting, from the client 101, designation of a region of interest in an image corresponding to image data. More specifically, the region of interest obtaining unit 510 sets a region linked to a stream by which the client 101 transmits an HTTP GET request, as a region of interest. However, the present invention is not limited to this, and the server 102 can obtain a region of interest of the client 101 by another method. For example, the server 102 may also obtain a region of interest from the value of an HTTP header field. For example, when receiving an HTTP request containing a header field "set-tile:p" from the client 101, the server 102 determines that a region linked to this stream is a region of interest. When receiving an HTTP request containing a header field "set-tile:s" from the client 101, the server 102 determines that a region linked to this stream is a peripheral region. When receiving an HTTP request containing a header field "set-tile:n" from the client 101, the server 102 determines that a region linked to this stream is neither a region of interest nor a peripheral region. Note that the description method of the header field by which the client 101 notifies the server of a region of interest is not limited to the method introduced in this embodiment.

The stream setting unit 509 sets stream control for an HTTP/2 stream (step S1105). When the client transmits a priority frame for setting a priority, the stream setting unit 509 sets the priority of a stream based on the value of the frame.

Also, when receiving a push policy from the client 101, the stream setting unit 509 sets a push policy for the corresponding stream. The server 102 notifies the client of the set push policy. Hence, the server 102 can set a push policy for each stream. Consequently, the server 102 can set fine push transmission control for streams.

The server 102 determines whether the band of the network has a margin for transmitting a region of interest with high image quality (step S1106). More specifically, the band obtaining unit 513 obtains the bandwidth of the network between the server 102 and the client 101. The server 102 obtains the bit rate of a high-image-quality segment of the region of interest. If the designated region includes a plurality of tiles, the server 102 obtains the sum of the bit rates of the plurality of tiles. The server 102 may also calculate the bit rate from the size of the high-image-quality segment of the region of interest and the playback time of the segment.

The server 102 compares the bandwidth of the network with the bit rate of the segment. If the bandwidth obtained by the band obtaining unit 513 is equal to or larger than the bit rate of the segment, the server 102 determines that there is a margin for high-image-quality transmission (YES in step S1106). If the bandwidth obtained by the band obtaining unit 513 is smaller than the bit rate of the segment, the server 102 determines that there is no margin for transmission (NO in step S1106).

For example, when the bit rate of the segment is 8 Mbps and the band is 10 Mbps, the bandwidth is larger than the bit rate, so the server 102 determines that there is a margin for transmitting the segment (YES in step S1106). As another example, when the bit rate of the segment is 8 Mbps and the band is 6 Mbps, the bandwidth is smaller than the bit rate, so the server 102 determines that there is no transmission margin (NO in step S1106). Details of the processing in step S1106 will be described later with reference to FIG. 13.

If the server 102 determines YES in step S1106, the server 102 transmits the high-image-quality segment of the region of interest to the client 101 by push (step S1107). Details of the processing in step S1107 will be described later with reference to FIG. 14.

The server 102 determines whether the band of the network has a margin for transmitting a peripheral region with high image quality (step S1108). More specifically, the band obtaining unit 513 obtains the bandwidth of the network between the server 102 and the client 101. If there is a segment of a region of interest currently being transmitted or scheduled to be transmitted, the server 102 also obtains the bit rate of the segment. The server 102 obtains the bit rate of a high-image-quality segment of the peripheral region. The server 102 compares the bandwidth with the sum of the bit rates of the segments in the region of interest and the peripheral region. If the bandwidth is equal to or larger than the sum of the bit rates of the segments in the region of interest and the peripheral region, the server 102 determines that there is a margin for high-image-quality transmission (YES in step S1108). If the bandwidth is smaller than the sum of the bit rates of the segments in the region of interest and the peripheral region, the server 102 determines that there is no transmission margin (NO in step S1108). Details of the process of determining whether to transmit the peripheral region with high image quality will be described later with reference to FIG. 13. Note that when the peripheral region includes a plurality of regions, the server 102 may also transmit some regions with high image quality and transmit the rest with low image quality. For example, when the region of interest is one tile, tiles in the upper, lower, left, and right positions of the tile are transmitted with high image quality, and four tiles in the upper right, lower right, lower left, and upper left positions are transmitted with low image quality.

If the server 102 determines in step S1108 that there is a transmission margin (YES in step S1108), the server 102 transmits the high-image-quality segment in the peripheral region to the client 101 by push (step S1109). Details of the processing in step S1109 will be described later with reference to FIG. 14.

If the server 102 determines in step S1108 that there is no transmission margin (NO in step S1108), the server 102 determines whether the band of the network has a margin for transmitting the peripheral region with low image quality (step S1111). More specifically, the band obtaining unit 513 obtains the bandwidth of the network between the server 102 and the client 101. If there is a segment of a region of interest currently being transmitted or scheduled to be transmitted, the server 102 also obtains the bit rate of the segment. The server 102 obtains the bit rate of a low-image-quality segment of the peripheral region. The server 102 compares the bandwidth with the sum of the bit rates of the segments in the region of interest and the peripheral region. If the bandwidth is equal to or larger than the sum of the bit rates of the segments in the region of interest and the peripheral region, the server 102 determines that there is a margin for low-image-quality transmission (YES in step S1111). If the bandwidth is smaller than the sum of the bit rates of the segments in the region of interest and the peripheral region, the server 102 determines that there is no transmission margin (NO in step S1111). Details of the process of determining whether to transmit the peripheral region with low image quality will be described later with reference to FIG. 13.

If the server 102 determines to transmit the peripheral region with low image quality (YES in step S1111), the server 102 transmits the low-image-quality segment of the peripheral region to the client 101 by push (step S1112).

If the server 102 determines in step S1106 that there is no margin for transmitting the region of interest with high image quality (NO in step S1106), the server 102 determines whether the band of the network has a margin for transmitting the region of interest with low image quality (step S1113). More specifically, the band obtaining unit 513 obtains the bandwidth of the network between the server 102 and the client 101. The server 102 obtains the bit rate of a low-image-quality segment of the region of interest. The server 102 compares the bandwidth of the network with the bit rate of the segment of the region of interest. If the bandwidth obtained by the band obtaining unit 513 is equal to or larger than the bit rate of the segment, the server 102 determines YES in step S1113. If the bandwidth obtained by the band obtaining unit 513 is smaller than the bit rate of the segment, the server 102 determines that there is no margin for low-image-quality transmission (NO in step S1113). Details of the processing in step S1106 will be described later with reference to FIG. 13.

If the server 102 determines that there is a margin for transmitting the region of interest with low image quality (YES in step S1113), the server 102 transmits the low-image-quality segment of the region of interest to the client 101 by push (step S1114). Details of the processing in step S1114 will be described later with reference to FIG. 14.

When completing the above processing, the server 102 determines whether to terminate the procedure shown in FIG. 12B (step S1110). If the server 102 determines to terminate the procedure (YES in step S1110), the server 102 terminates the procedure; if not (NO in step S1110), the server 102 returns to step S1104.

Segment Transmission Determination Process

Figure 13:
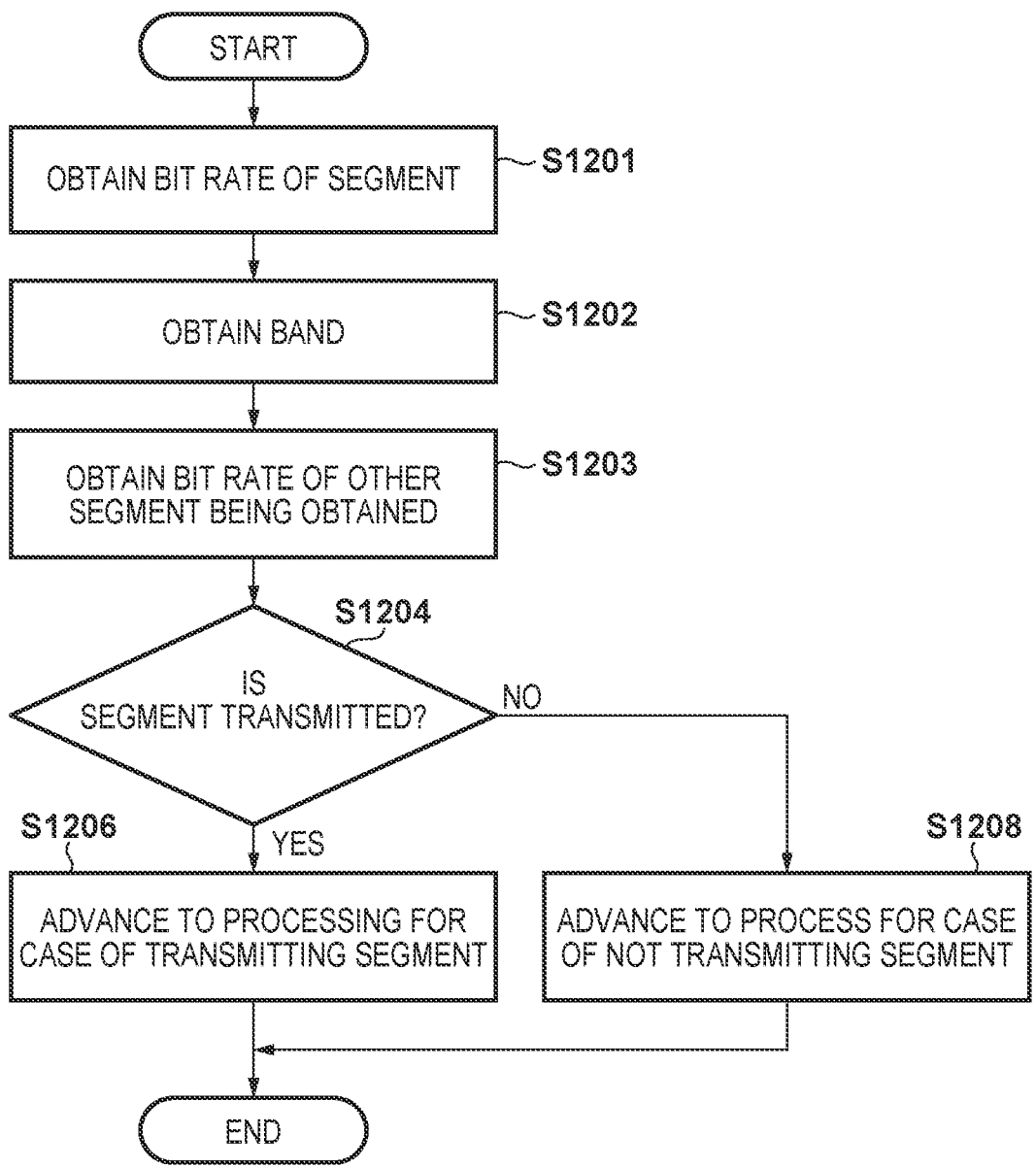
FIG. 13 is a flowchart showing the operation of the server.

FIG. 13 is a flowchart called from steps S1106, S1108, S1111, and S1113 in FIG. 12B. In FIG. 13, whether to transmit a region designated by the caller of FIG. 13 with designated image quality is determined.

In step S1106, a region of interest is designated as a region, high image quality is designated as image quality, and the flowchart in FIG. 13 is called. In step S1108, a peripheral region is designated as a region, high image quality is designated as image quality, and the flowchart in FIG. 13 is called. In step S1111, a peripheral region is designated as a region, low image quality is designated as image quality, and the flowchart in FIG. 13 is called. In step S1113, a region of interest is designated as a region, low image quality is designated as image quality, and the flowchart in FIG. 13 is called.

The server 102 obtains the bit rate of a segment of the designated region in the designated layer (step S1201). If the designated region includes a plurality of tiles, the server 102 obtains the sum of the bit rates of the plurality of tiles. The server 102 may also calculate the bit rate from the size of the designated segment of the designated region, and the playback time of the segment.

The band obtaining unit 513 obtains the band of the network between the server 102 and the client 101 (step S1202). The band obtaining unit 513 can obtain the band by using the existing method of measuring the band of the network, and can also obtain the band by calculating the value of the band from the past transmission log by the client 101.

If there is another segment currently being transmitted, the server 102 obtains the file size of the segment (step S1203). For example, when the flowchart of FIG. 13 is called by designating a peripheral region (step S1108 or S1113), the server 102 obtains the bit rate of a segment of a region of interest (step S1203).

The server 102 determines whether to transmit the segment (step S1204). For example, if the bandwidth is equal to or larger than the bit rate of the segment to be transmitted (YES in step S1204), the server 102 determines to transmit the segment. If the bandwidth is smaller than the bit rate (NO in step S1204), the server 102 determines not to transmit the segment. More specifically, when the bit rate of the segment to be transmitted is 8 Mbps and the band is 10 Mbps, the bandwidth is larger than the bit rate, so the server 102 determines to transmit the segment. As another example, when the bit rate of the segment to be transmitted is 8 Mbps and the band is 6 Mbps, the bandwidth is smaller than the bit rate, so the server 102 determines not to transmit the segment.

The server 102 advances to processing for transmitting the segment (step S1206). For example, if this flowchart is called from step S1106, the server 102 advances to step S1107. The server advances to processing not for transmitting the segment (step S1208). For example, if this flowchart is called from step S1106, the server advances to step S1113.

Segment Transmitting Process

Figure 14:
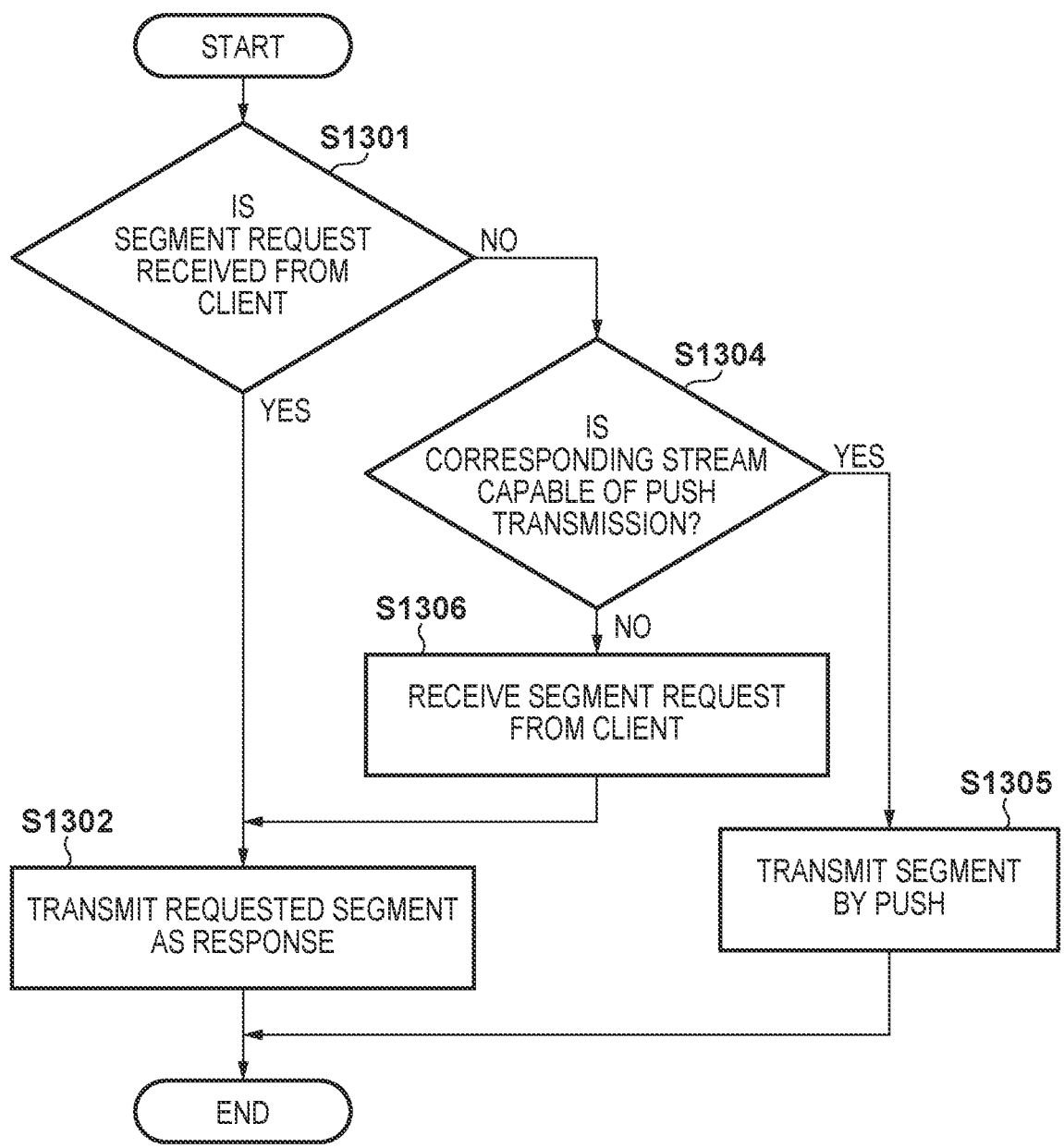
FIG. 14 is a flowchart showing the operation of the server.

A segment transmitting process will be explained with reference to FIG. 14. In FIG. 14, a process of transmitting a region designated by the caller of FIG. 14 with designated image quality is performed.

In step S1107, a region of interest is designated as a region, high image quality is designated as image quality, and the flowchart in FIG. 14 is called. In step S1109, a peripheral region is designated as a region, high image quality is designated as image quality, and the flowchart in FIG. 14 is called. In step S1112, a peripheral region is designated as a region, low image quality is designated as image quality, and the flowchart in FIG. 14 is called. In step S1114, a region of interest is designated as a region, low image quality is designated as image quality, and the flowchart in FIG. 14 is called.

The server 102 determines whether an HTTP request is received as a segment transmission request from the client (step S1301). If the server 102 determines that the HTTP request is received from the client (YES in step S1301), the server 102 transmits a segment requested by the HTTP request as an HTTP response (step S1302).

If the server 102 determines that the HTTP request is not received from the client (NO in step S1301), the server 102 advances to step S1304. In step S1304, the server 102 determines whether push can be performed by a push stream linked to a segment having the designated image quality in the designated region. For example, if the HTTP/2 connection established between the server 102 and the client 101 is set to be unable to transmit push, the server 102 determines that the corresponding stream is incapable of push transmission. Also, if a push policy of the corresponding stream is set to transmit no push, the server 102 determines that the corresponding stream is incapable of push.

If the server 102 determines that the corresponding stream is capable of push transmission (YES in step S1304), the server 102 transmits the segment having the designated image quality in the designated region (step S1305). If the server 102 determines that the corresponding stream is incapable of push transmission (NO in step S1304), the server 102 receives an HTTP request from the client 101 (step S1306).

Note that in this embodiment, a case in which two layers, that is, a low-image-quality layer and a high-image-quality exist has been explained. However, the present invention is not limited to this, and this embodiment is also applicable to one layer divided into regions. In this case, the client 101 can be implemented by skipping processes related to low-image-quality segments such as steps S616, S617, S614, and S615 in the flowchart of FIG. 7B. The server 102 can be implemented by skipping processes related to low-image-quality segments such as steps S1111, S1112, S1113, and S1114 in FIG. 12B.

In this embodiment as has been explained above, the client 101 controls obtaining of a region of interest and a peripheral region by using logical streams. More specifically, the client 101 establishes a plurality of streams as logical communication paths with respect to the server 102, and designates a region of interest in an image corresponding to video data. Furthermore, the client 101 determines streams for receiving video data of the region of interest and video data of a partial area other than the region of interest, so that the stream for receiving the video data of the region of interest and the stream for receiving the video data of the partial area other than the region of interest are different from each other. Then, the client 101 notifies the server 102 of the determined streams. The server 102 transmits the video data to the client 101 by using the streams notified from the client 101. In this process, the server 102 preferentially transmits the video data of the region of interest to the client 101. This enables more detailed control so as not to consume the band of the network, and as a consequence the images of the region of interest of the user can seamlessly be switched. Even when the band is limited, therefore, the user can view images as smoothly as possible by establishing a stream for each region of image data, and preferentially transmitting and receiving the region of interest.

Second Embodiment

In the second embodiment, an example in which a server 102 notifies a client 101 of a change of a region of interest will be explained. In this embodiment, differences from the first embodiment will mainly be explained, and an explanation of contents common to the first embodiment will be omitted.

(Operation of Client)

Figure 15A:
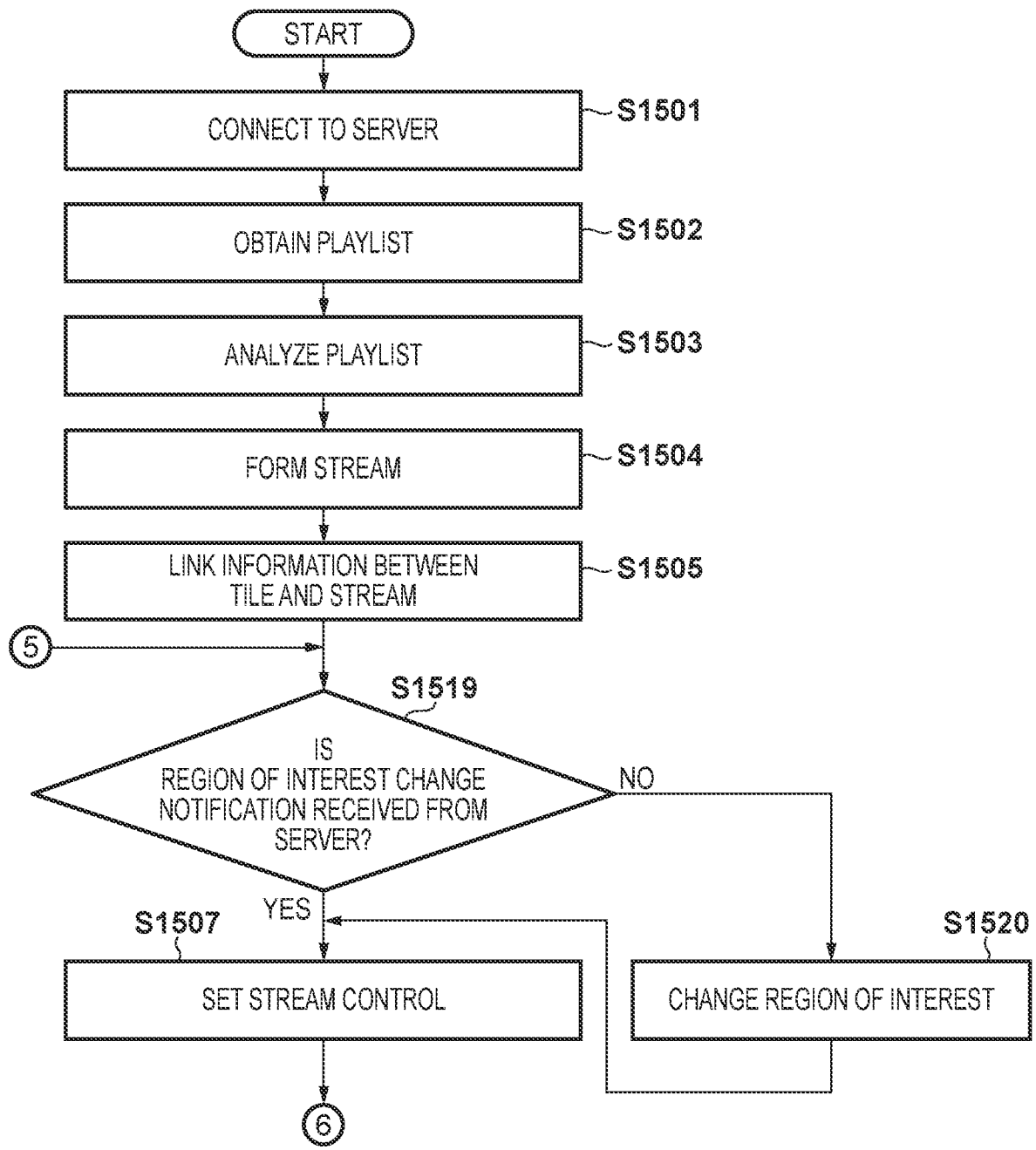
FIG. 15A is a flowchart showing the operation of the client.
Figure 15B:
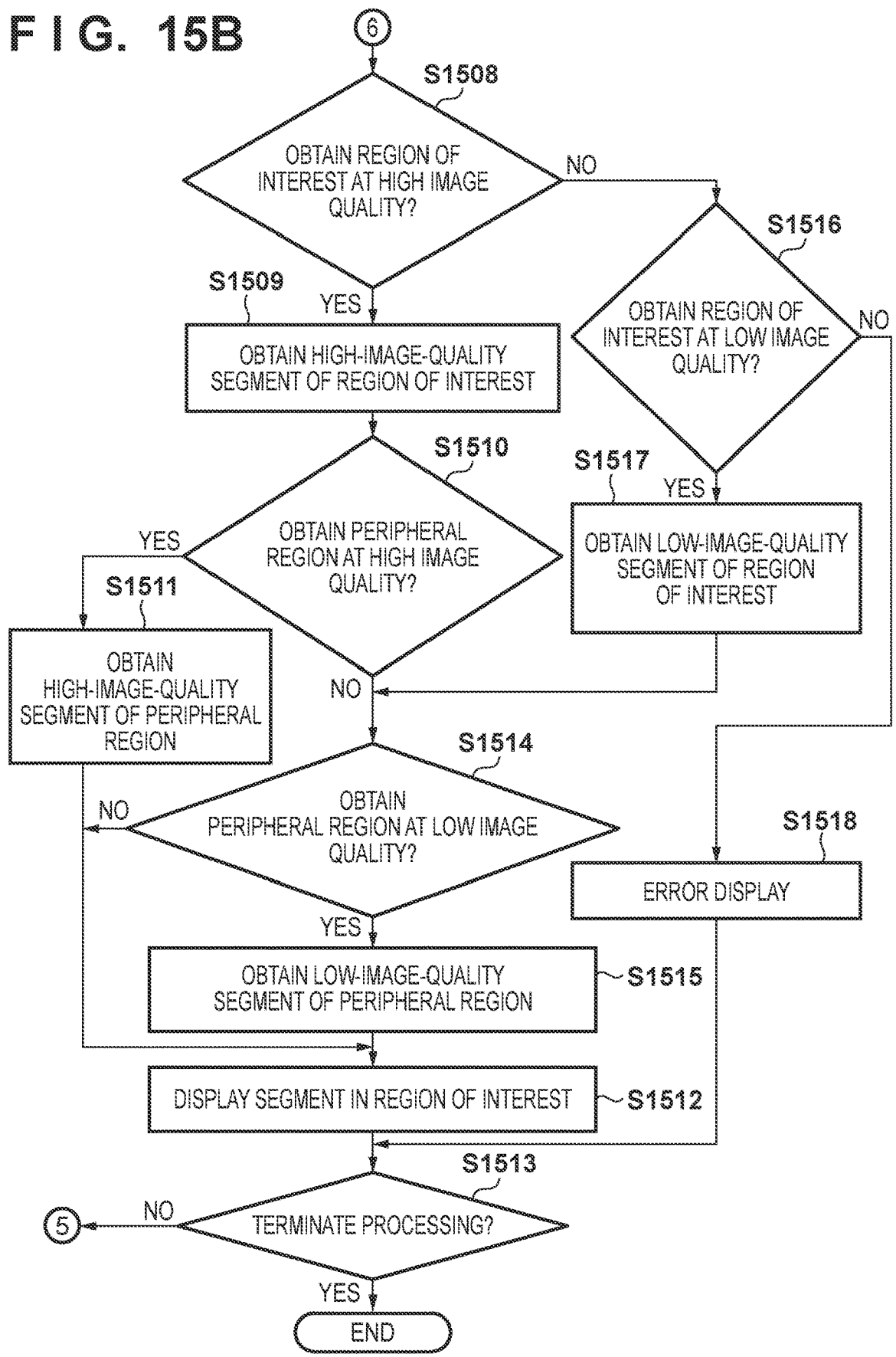
FIG. 15B is a flowchart showing the operation of the client.

FIGS. 15A and 15B are flowcharts of the client 101 according to the second embodiment. Each step in FIGS. 15A and 15B is executed under the control of a control unit 201 (a CPU) of the client 101. Differences from FIGS. 7A and 7B will be explained below.

Processes in steps S1501 to S1505 are the same as those in steps S601 to S605 of FIG. 7A. If the process in step S605 is complete, the client 101 determines in step S1519 whether a region of interest change notification is received from the server 102 (step S1519). The client 101 receives the region of interest change notification by push from the server 102. The client 101 determines a new region of interest from a region linked to the ID of a stream by which the change notification corresponding to the new region of interest is received. If the region of interest change notification is received (YES in step S1519), the process advances to step S1507. If the change notification is not received (NO in step S1519), the process advances to step S1520.

If a segment corresponding to the new region of interest is already received, the client 101 can immediately display the segment of the new region of interest on a display unit 205 by processing from step S1507. Also, when receiving the segment of the new region of interest, the client 101 can immediately display the received segment of the new region of interest on the display unit 205. This increases the possibility that the user can seamlessly switch regions which the user is currently viewing.

Note that if the region of interest change notification is not received (NO in step S1519), the client 101 may also form a stream for receiving the region of interest change notification. The client 101 switches video data to be displayed on the display unit 205 to the new region of interest (step S1520). Processes in steps S1507 to S1518 are the same as those in steps S607 to S618 of FIGS. 7A and 7B.

As described above, when receiving the region of interest change notification from the server 102, the client 101 updates the designation of the region of interest. This makes it possible to update a region of interest in accordance with, for example, a change in position which an object of image data occupies in the image data, and preferentially view a region having a higher importance.

(Operation of Server)

Figure 16A:
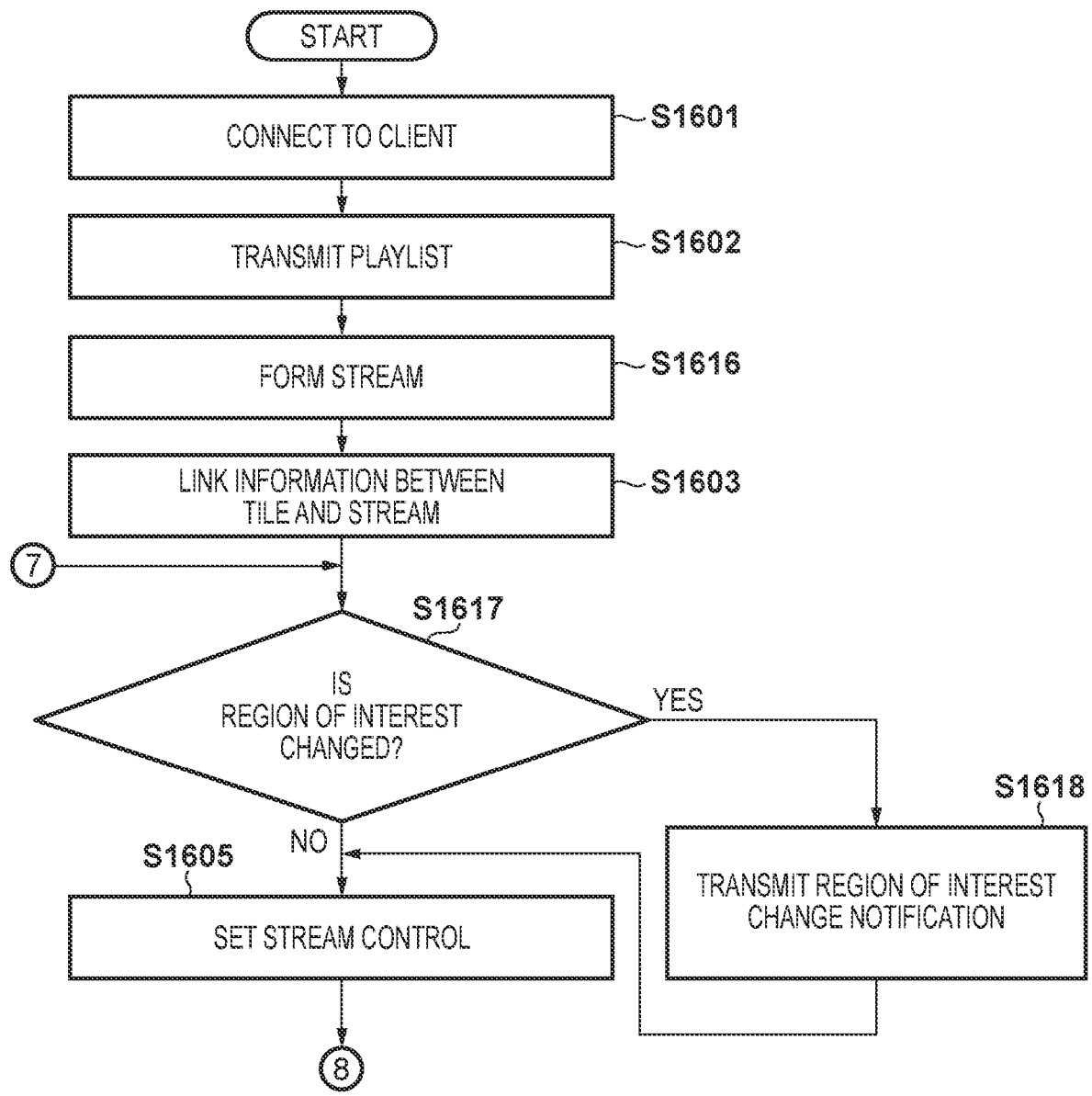
FIG. 16A is a flowchart showing the operation of the server.
Figure 16B:
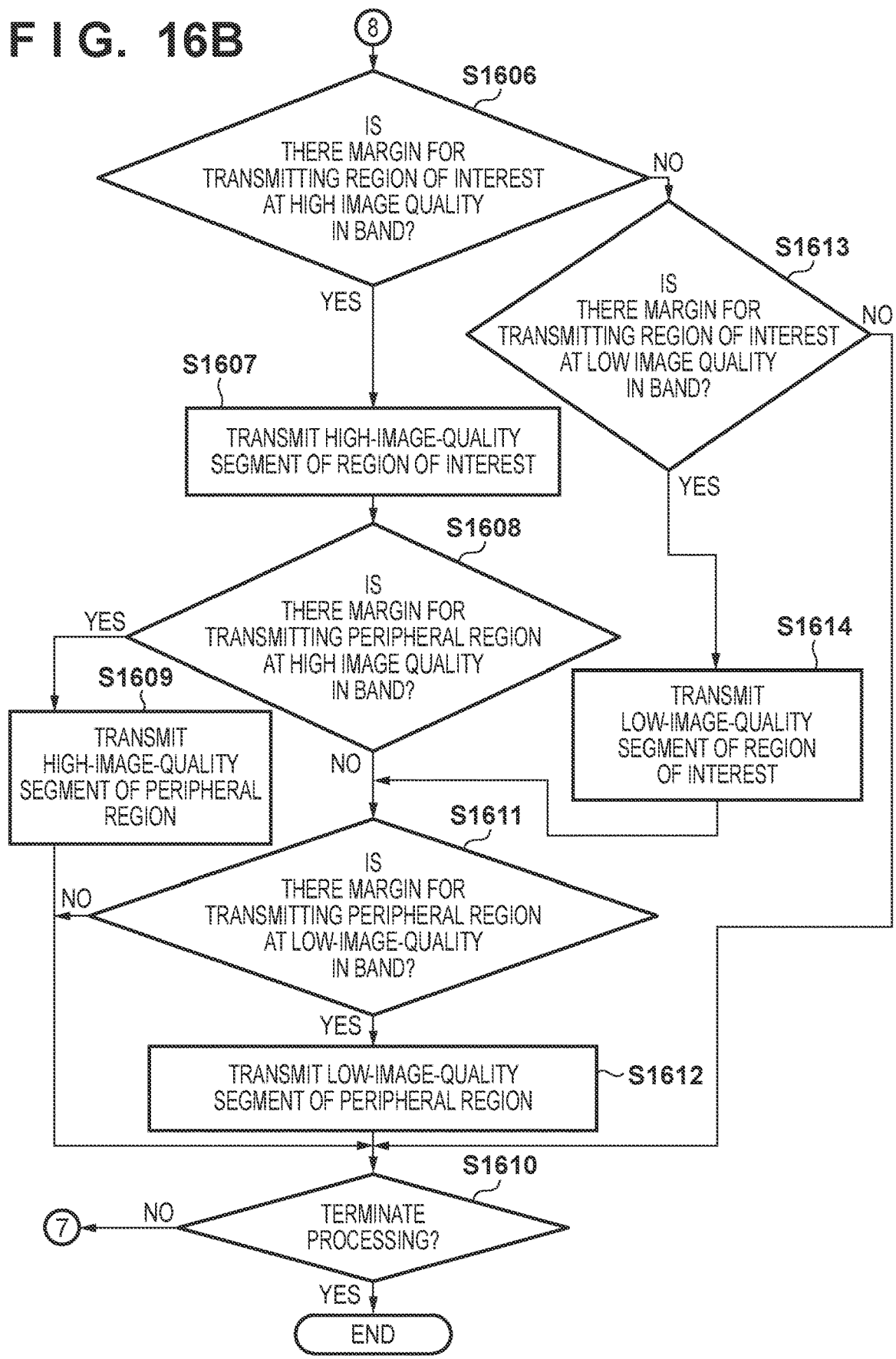
FIG. 16B is a flowchart showing the operation of the server.

FIGS. 16A and 16B are flowcharts of the server 102 according to the second embodiment. Each step in FIGS. 16A and 16B is executed under the control of a control unit 401 (a CPU) of the server 102. Differences from FIGS. 12A and 12B will be explained.

Processes in steps S1601, S1602, S1616, and S1603 are the same as those in steps S1101, S1102, S1116, and S1103 of FIG. 12A. When completing the process in step S1103, the server 102 determines whether to change the region of interest (step S1617).

Figure 17:
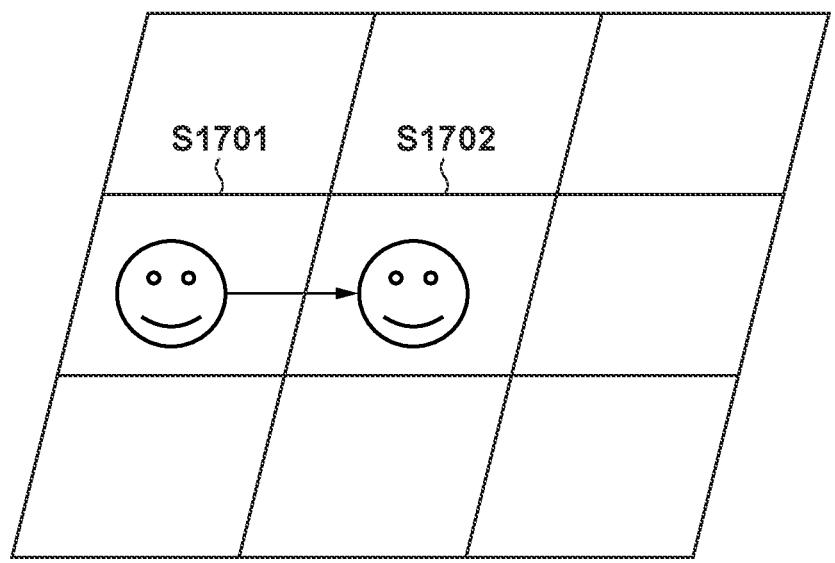
FIG. 17 is a view showing the way an object moves in video data.

An example of a method of determining whether to change the region of interest will be explained below, but the present invention is not limited to this method. As shown in FIG. 17, when a person in a region S1701 of interest on image data moves to a region S1702, the server 102 determines to change the region of interest (YES in step S1617). The server 102 can receive information of the person to be monitored from the client 101 and set a region containing the corresponding person as a region of interest, and can also analyze video data and set a region containing a suspicious person as a region of interest.

If the server 102 determines to change the region of interest (YES in step S1617), the server 102 notifies the client 101 of the change of the region of interest (step S1618). The server 102 notifies the new region of interest by using a push stream linked to the changed region of interest by the client 101. Accordingly, the client 101 can determine the new region of interest from the ID of the stream by which the change of the region of interest is received. The client 101 may also form a stream for transmitting a region of interest change notification. The client 101 can notify a URL indicating the changed region of interest, and can also transmit a segment of the changed region of interest. The server 102 can notify only the identifier of the new region of interest when a segment of the changed region of interest is transmitted to the client 101, and can also transmit the segment of the changed region of interest when the segment is not transmitted. Therefore, when the segment of the changed region of interest is already transmitted, the segment need not be transmitted, and this can reduce the processing load on the network.

As described above, the server 102 detects a change of a region of interest in accordance with a change of a position which an object of image data occupies in the image data, and notifies the client 101 of the change of the region of interest. Consequently, the client 101 can seamlessly switch the regions of interest. In each embodiment of the present invention as described above, detailed obtaining control is performed by linking a region of video data to a logical stream. Accordingly, when transmitting video data of a region of interest and video data of a peripheral region of the region of interest, a delay of the video data of the region of interest can be reduced.

When communicating image data of a region of interest and image data of a region not of interest, the present invention can reduce a delay of the communication of the image data of the region of interest.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus for receiving, from a server apparatus, image data of one or a plurality of partial areas of a plurality of partial areas forming an image, comprising:
a designating unit configured to designate a region of interest in the image;
an establishing unit configured to establish a connection as a logical communication path to the server apparatus, and establish, as a plurality of streams based on the connection to the server apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;
a control unit configured to control the plurality of streams such that the image data of the region of interest is obtained preferentially to the partial area;
a receiving unit configured to receive image data from the server apparatus by using the plurality of streams controlled by the control unit;
a band obtaining unit configured to obtain a band of a network between the information processing apparatus and the server apparatus;
a bit rate obtaining unit configured to obtain a bit rate of a partial area of the image data; and
a determining unit configured to determine image quality of the partial area of the image data to be received, based on a comparison of the band of the network with the bit rate of the partial area,
wherein the receiving unit receives image data of a partial area having the image quality determined by the determining unit.

2. The information processing apparatus according to claim 1, wherein the receiving unit receives the image data of the region of interest, and then receives the image data of the partial area other than the region of interest.

3. The information processing apparatus according to claim 1, wherein the determining unit determines that image quality of the region of interest is higher than that of a partial area other than the region of interest.

4. The information processing apparatus according to claim 1, wherein the determining unit determines whether to receive image data of the partial area, based on the comparison of the band of the network with the bit rate of the partial area.

5. The information processing apparatus according to claim 1, wherein, if the band of the network has a margin even after image data of the region of interest is received, the determining unit determines to receive image data of the partial area other than the region of interest.

6. The information processing apparatus according to claim 1, wherein the receiving unit receives the image data from the server apparatus by push communication.

7. The information processing apparatus according to claim 1, wherein the designating unit designates the region of interest based on a playlist indicating a spatial divisional configuration of image data provided by the server apparatus.

8. The information processing apparatus according to claim 1, wherein the control unit sets a priority for at least one of the plurality of streams, such that a priority of a stream for communicating image data of the region of interest is not lower than that of a stream for communicating image data of a partial area other than the region of interest.

9. An information processing apparatus for receiving, from a server apparatus, image data of one or a plurality of partial areas of a plurality of partial areas forming an image, comprising:
a designating unit configured to designate a region of interest in the image;
an establishing unit configured to establish a connection as a logical communication path to the server apparatus, and establish, as a plurality of streams based on the connection to the server apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;
a control unit configured to control the plurality of streams such that the image data of the region of interest is obtained preferentially to the partial area; and
a receiving unit configured to receive image data from the server apparatus by using the plurality of streams controlled by the control unit,
wherein the control unit controls window sizes to be allocated to the plurality of streams, such that a buffer capacity to be allocated to a stream for communicating image data of the region of interest is not smaller than a buffer capacity to be allocated to a stream for communicating image data of the partial area.

10. An information processing apparatus for transmitting, to a client apparatus, image data of one or a plurality of partial areas of a plurality of partial areas forming an image, comprising:
an accepting unit configured to accept designation of a region of interest in the image from the client apparatus;
an establishing unit configured to establish a connection as a logical communication path to the client apparatus, and establish, as a plurality of streams based on the connection to the client apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;
a control unit configured to control the plurality of streams such that the image data of the region of interest is obtained preferentially to the partial area;
a transmitting unit configured to transmit image data to the client apparatus by using the plurality of streams controlled by the control unit;
a band obtaining unit configured to obtain a band of a network between the information processing apparatus and the client apparatus;
a bit rate obtaining unit configured to obtain a bit rate of a partial area of the image data; and
a determining unit configured to determine image quality of the partial area of the image data to be transmitted, based on a comparison of the band of the network with the bit rate of the partial area, wherein the transmitting unit transmits image data of a partial area having the image quality determined by the determining unit.

11. The information processing apparatus according to claim 10, wherein the determining unit determines that image quality of the region of interest is higher than that of a partial area other than the region of interest.

12. The information processing apparatus according to claim 10, wherein the determining unit determines whether to transmit image data of the partial area, based on the comparison of the band of the network with the bit rate of the partial area.

13. The information processing apparatus according to claim 12, wherein if the band of the network has a margin even after image data of the region of interest is transmitted, the determining unit determines to transmit image data of the partial area other than the region of interest.

14. The information processing apparatus according to claim 10, wherein the transmitting unit transmits the image data to the client apparatus by push communication.

15. The information processing apparatus according to claim 10, further comprising a detecting unit configured to detect a change of the region of interest, in accordance with a change of a position which an object in the image data occupies in the image data, wherein the transmitting unit notifies the client apparatus of the change of the region of interest in accordance with the detection of the change of the region of interest by the detecting unit.

16. A control method of an information processing apparatus for receiving, from a server apparatus, image data of one or a plurality of partial areas of a plurality of partial areas forming an image, comprising:

determining a region of interest in the image;

establishing a connection as a logical communication path to the server apparatus, and establishing, as a plurality of streams based on the connection to the server apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;

receiving image data from the server apparatus by using the plurality of streams controlled such that the image data of the region of interest is obtained preferentially to the partial area;

obtaining a band of a network between the information processing apparatus and the server apparatus;

obtaining a bit rate of a partial area of the image data;

determining image quality of the partial area of the image data to be received, based on a comparison of the band of the network with the bit rate of the partial area, and receiving image data of a partial area having the image quality determined in the determining.

17. A control method of an information processing apparatus for transmitting, to a client apparatus, image data of one or a plurality of partial areas of a plurality of partial areas forming an image, comprising:

accepting designation of a region of interest in the image from the client apparatus;

establishing a connection as a logical communication path to the client apparatus, and establishing, as a plurality of streams based on the connection to the client apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;

transmitting image data to the client apparatus by using the plurality of streams controlled such that the image data of the region of interest is obtained preferentially to the partial area;

obtaining a band of a network between the information processing apparatus and the client apparatus;

obtaining a bit rate of a partial area of the image data;

determining image quality of the partial area of the image data to be transmitted, based on a comparison of the band of the network with the bit rate of the partial area; and transmitting image data of a partial area having the image quality determined.

18. A non-transitory computer-readable storage medium storing a program for executing a control method of an information processing apparatus for receiving, from a server apparatus, image data of one or a plurality of partial areas of a plurality of partial areas forming an image, the method comprising:

determining a region of interest in the image;

establishing a connection as a logical communication path to the server apparatus, and establishing, as a plurality of streams based on the connection to the server apparatus, a plurality of streams including a stream for receiving image data of the region of interest, and a stream for receiving image data of a partial area other than the region of interest, such that the stream for receiving image data of a partial area other than the region of interest are different from each other;

receiving image data from the server apparatus by using the plurality of streams controlled such that the image data of the region of interest is obtained preferentially to the partial area;

obtaining a band of a network between the information processing apparatus and the server apparatus;

obtaining a bit rate of a partial area of the image data;

determining image quality of the partial area of the image data to be received, based on a comparison of the band of the network with the bit rate of the partial area, and receiving image data of a partial area having the image quality determined in the determining.

19. A control method of an information processing apparatus for receiving, from a server apparatus, image data of one or a plurality of partial areas of a plurality of partial areas forming an image, the method comprising:

determining a region of interest in the image;

establishing a connection as a logical communication path to the server apparatus, and establish, as a plurality of streams based on the connection to the server apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;

receiving image data from the server apparatus by using the plurality of streams controlled such that the image data of the region of interest is obtained preferentially to the partial area; and controlling window sizes to be allocated to the plurality of streams, such that a buffer capacity to be allocated to a stream for communicating image data of the region of interest is not smaller than a buffer capacity to be allocated to a stream for communicating image data of the partial area.

20. A non-transitory computer-readable storage medium storing a program for executing a control method of an information processing apparatus for receiving, from a server apparatus, image data of one or a plurality of partial areas of a plurality of partial areas forming an image, the method comprising:

determining a region of interest in the image;

establishing a connection as a logical communication path to the server apparatus, and establish, as a plurality of streams based on the connection to the server apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;

receiving image data from the server apparatus by using the plurality of streams controlled such that the image data of the region of interest is obtained preferentially to the partial area; and controlling window sizes to be allocated to the plurality of streams, such that a buffer capacity to be allocated to a stream for communicating image data of the region of interest is not smaller than a buffer capacity to be allocated to a stream for communicating image data of the partial area.

21. A non-transitory computer-readable storage medium storing a program for executing a control method of an information processing apparatus for transmitting, to a client apparatus, image data of one or a plurality of partial areas of a plurality of partial areas forming an image, the method comprising:

accepting designation of a region of interest in the image from the client apparatus;

establishing a connection as a logical communication path to the client apparatus, and establishing, as a plurality of streams based on the connection to the client apparatus, a plurality of streams including a stream for receiving image data of the region of interest, and a stream for receiving image data of a partial area other than the region of interest, such that the stream for receiving the image data of the region of interest and the stream for receiving the image data of the partial area other than the region of interest are different from each other;

transmitting image data to the client apparatus by using the plurality of streams controlled such that the image data of the region of interest is obtained preferentially to the partial area;

obtaining a band of a network between the information processing apparatus and the client apparatus;

obtaining a bit rate of a partial area of the image data;

determining image quality of the partial area of the image data to be transmitted, based on a comparison of the band of the network with the bit rate of the partial area; and transmitting image data of a partial area having the image quality determined.

* * * * *